United States Patent
Ishibashi

(10) Patent No.: US 11,295,464 B2
(45) Date of Patent: Apr. 5, 2022

(54) SHAPE MEASUREMENT DEVICE, CONTROL METHOD, AND RECORDING MEDIUM

(71) Applicant: CANON KABUSHIKI KAISHA, Tokyo (JP)

(72) Inventor: Takuya Ishibashi, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 104 days.

(21) Appl. No.: 16/728,408

(22) Filed: Dec. 27, 2019

(65) Prior Publication Data

US 2020/0211212 A1 Jul. 2, 2020

(30) Foreign Application Priority Data

Dec. 28, 2018 (JP) .............................. JP2018-248365

(51) Int. Cl.
| | |
|---|---|
| *G06T 7/11* | (2017.01) |
| *G06T 7/521* | (2017.01) |
| *G06T 7/586* | (2017.01) |
| *G06T 7/593* | (2017.01) |

(52) U.S. Cl.
CPC ................ *G06T 7/586* (2017.01); *G06T 7/11* (2017.01); *G06T 7/593* (2017.01)

(58) Field of Classification Search
None
See application file for complete search history.

(56) References Cited

U.S. PATENT DOCUMENTS

| 2007/0025612 A1* | 2/2007 | Iwasaki | G06F 3/0421 382/154 |
| 2015/0320296 A1* | 11/2015 | Morita | G06T 7/0012 348/65 |
| 2020/0341558 A1* | 10/2020 | Fukushima | G06K 9/00201 |

OTHER PUBLICATIONS

Kadambi et al., "Polarized 3D: High-Quality Depth Sensing with Polarization Cues," 2015 IEEE International Conference on Computer Vision (Year: 2015).*

(Continued)

*Primary Examiner* — Soo Shin
(74) *Attorney, Agent, or Firm* — Cowan, Liebowitz & Latman, P.C.

(57) ABSTRACT

A shape measurement device composes shape information indicating a three-dimensional shape of a subject based on normal information and distance information acquired for the subject. The normal and distance information are two-dimensional information and have a pixel structure corresponding to the two-dimensional image. The device acquires the normal and distance information, sets processing-target segment regions with respect to the two-dimensional image upon composition of the shape information of the subject, composes, for each of the segment regions, first shape information based on the normal information, composes, for each of the segment regions, second shape information acquired by changing the first shape information based on the distance information, and composes combined shape information indicating the three-dimensional shape of the subject by combining the second shape information for a plurality of the segment regions.

17 Claims, 13 Drawing Sheets

(56) References Cited

OTHER PUBLICATIONS

Wang et al., "3D shape percetion from monocular vision, touch, and shape priors," 2018 IEEE/RSJ International Conference on Intelligent Robots and Systems (IROS), Madrid, Spain, Oct. 1-5, 2018 (Year: 2018).*

Achuta Kadambi et al., "Polarized 3D: High-Quality Depth Sensing with Polarization Cues" 2015 IEEE International Conference on Computer Vision (ICCV), pp. 3370-3378.

* cited by examiner

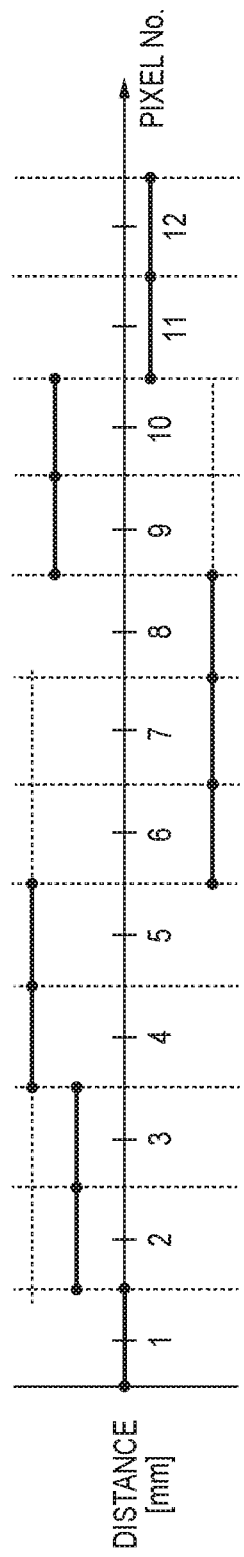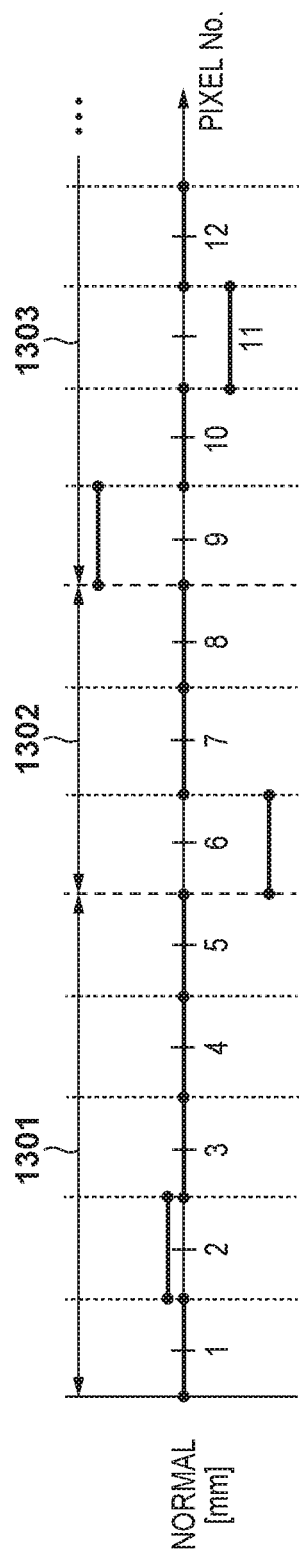

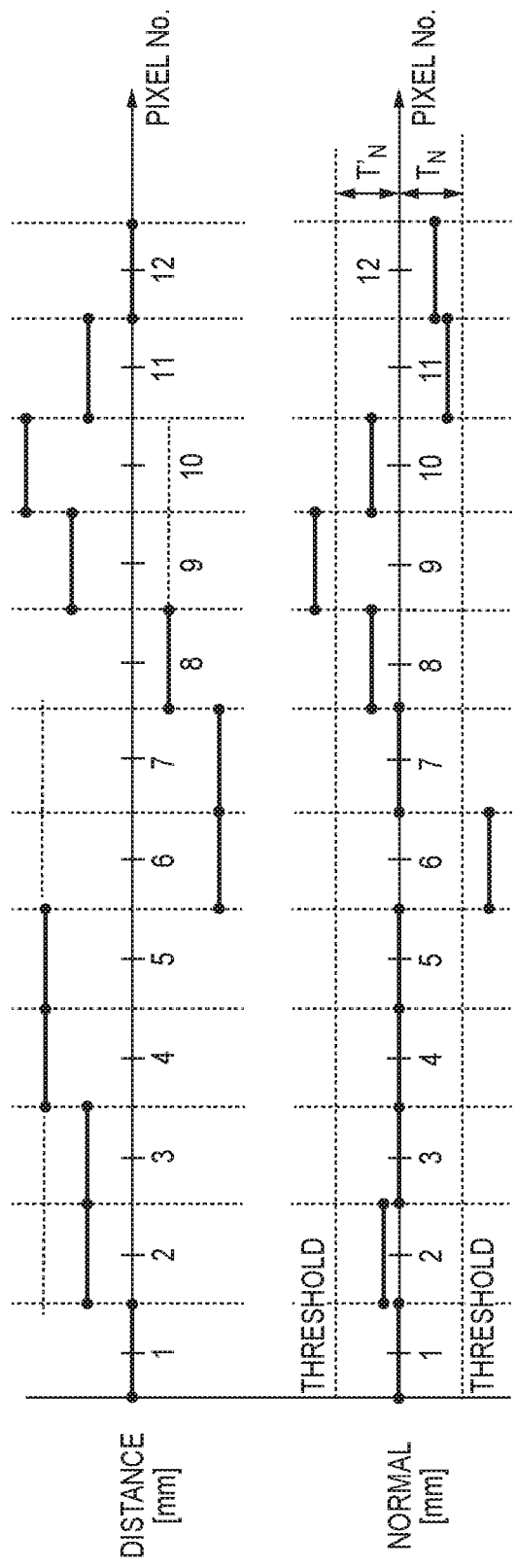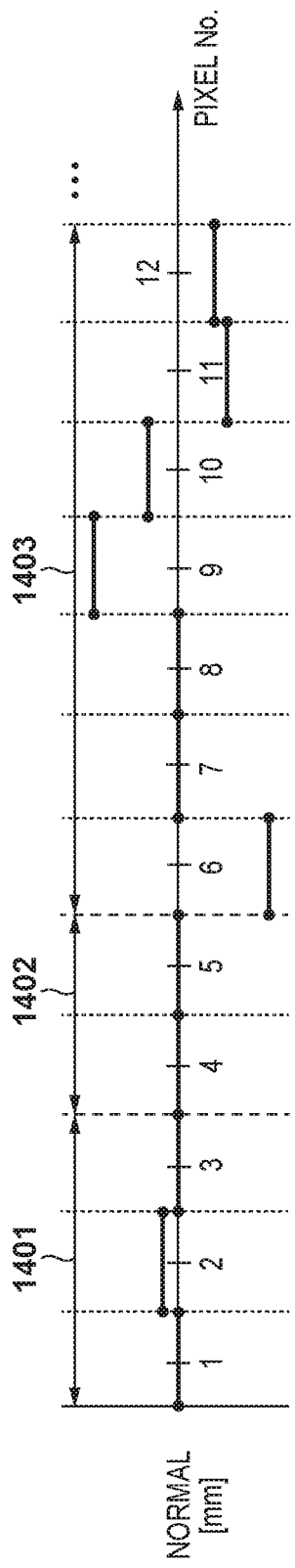

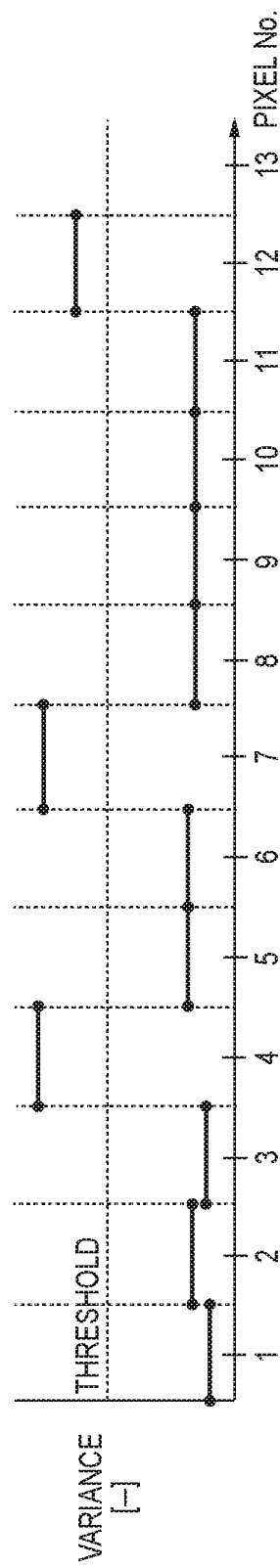
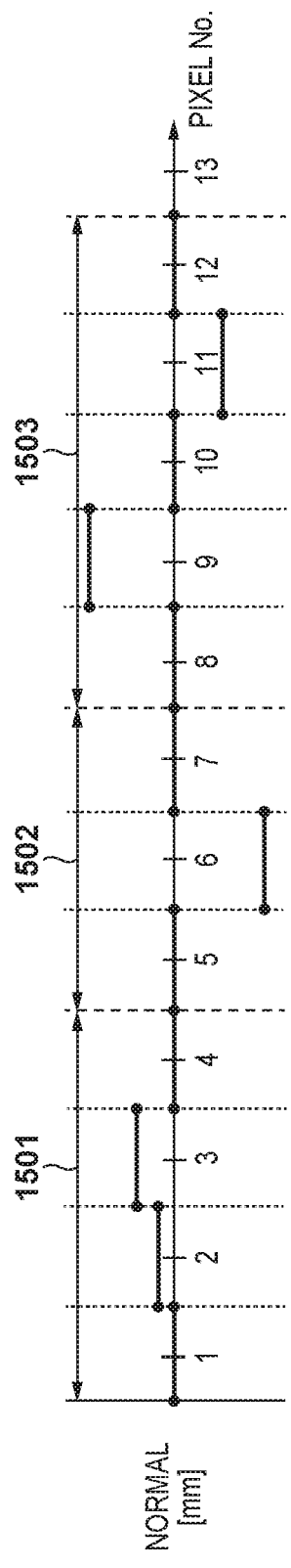

SHAPE MEASUREMENT DEVICE, CONTROL METHOD, AND RECORDING MEDIUM

BACKGROUND OF THE INVENTION

Field of the Invention

The present invention relates to a shape measurement device, a control method, and a recording medium, and particularly to technology for composing a three-dimensional shape of a subject included in an image capture range.

Description of the Related Art

There is a method of measuring a three-dimensional shape of a subject based on information acquired through image capturing. The document "Polarized 3D: High-Quality Depth Sensing with Polarization Cues" (Achuta Kadambi, Vage Taamazyan, Boxin Shi and Ramesh Raskar, 2015 IEEE International Conference on Computer Vision (ICCV), pages 3370-3378, 2015) discloses a method of composing a three-dimensional shape of a subject by using depth information to correct surface information based on normal information having been acquired.

Incidentally, in the composition method disclosed in Kadambi et al., the composition of a three-dimensional shape with high accuracy is realized by composing shape information by collectively integrating normal information having been acquired for all pixels in a captured image, and further correcting the shape information by using depth information. On the other hand, with this technique, a computation chip with sufficient performance and a memory having a corresponding computation area are necessary, and the mounting cost may increase. For example, with this technique, a matrix having 1,000,000 rows and 1,000,000 columns is necessary in the case of a 1,000×1,000 pixel captured image.

SUMMARY OF THE INVENTION

The present invention was made in view of such problems in the conventional technique. The present invention provides a shape measurement device, a control method, and a recording medium for composing a three-dimensional shape with high accuracy while reducing computation cost.

The present invention in its first aspect provides a shape measurement device that composes shape information indicating a three-dimensional shape of a subject included in an image capture range based on normal information and distance information acquired for the subject, wherein the normal information and the distance information are two-dimensional information corresponding to a two-dimensional image in which the image capture range is captured and have a pixel structure corresponding to the two-dimensional image, and the shape measurement device comprises: one or more processors; and a memory storing instructions which, when executed by the one or more processors, cause the cleaning apparatus to function as: an acquisition unit configured to acquire the normal information and the distance information; a setting unit configured to set processing-target segment regions with respect to the two-dimensional image upon composition of the shape information of the subject; a first composition unit configured to, for each of the segment regions, compose first shape information based on the normal information; a second composition unit configured to, for each of the segment regions, compose second shape information acquired by changing the first shape information based on the distance information; and a combination unit configured to compose combined shape information indicating the three-dimensional shape of the subject by combining the second shape information for a plurality of the segment regions.

The present invention in its second aspect provides a control method of a shape measurement device that composes shape information indicating a three-dimensional shape of a subject included in an image capture range based on normal information and distance information acquired for the subject, wherein the normal information and the distance information are two-dimensional information corresponding to a two-dimensional image in which the image capture range is captured and have a pixel structure corresponding to the two-dimensional image, and the control method comprises: acquiring the normal information and the distance information; setting processing-target segment regions with respect to the two-dimensional image upon composition of the shape information of the subject; composing, for each of the segment regions, first shape information based on the normal information; composing, for each of the segment regions, second shape information acquired by changing the first shape information based on the distance information; and composing combined shape information indicating the three-dimensional shape of the subject by combining the second shape information for a plurality of the segment regions.

The present invention in its third aspect provides a non-transitory computer-readable recording medium having recorded thereon a program for causing a computer that composes shape information indicating a three-dimensional shape of a subject included in an image capture range based on normal information and distance information, which are acquired for the subject, which are two-dimensional information corresponding to a two-dimensional image in which the image capture range is captured, and which have a pixel structure corresponding to the two-dimensional image, to execute: acquiring the normal information and the distance information; setting processing-target segment regions with respect to the two-dimensional image upon composition of the shape information of the subject; composing, for each of the segment regions, first shape information based on the normal information; composing, for each of the segment regions, second shape information acquired by changing the first shape information based on the distance information; and composing combined shape information indicating the three-dimensional shape of the subject by combining the second shape information for a plurality of the segment regions.

Further features of the present invention will become apparent from the following description of exemplary embodiments (with reference to the attached drawings).

BRIEF DESCRIPTION OF THE DRAWINGS

FIGS. 13A and 13B are diagrams for describing a form of setting of segment regions, pertaining to embodiment 2 of the present invention.

FIGS. 14A and 14B are other diagrams for describing a form of setting of the segment regions, pertaining to embodiment 2 of the present invention.

FIGS. 15A and 15B are other diagrams for describing a form of setting of the segment regions, pertaining to embodiment 2 of the present invention.

DESCRIPTION OF THE EMBODIMENTS

Embodiment 1

In the following, an example embodiment of the present invention will be described in detail with reference to the drawings. Note that in the embodiment described in the following, an example will be described in which the present invention is applied to a digital camera serving as one example of a shape measurement device. The digital camera is provided with a function of measuring subject distances and a function of deriving normals for a subject in an image capture range. However, the present invention is applicable to any device that can compose a three-dimensional shape of a subject based on information of subject distances and normals of the subject acquired through image capturing.

Configuration of Digital Camera

Figure 1:
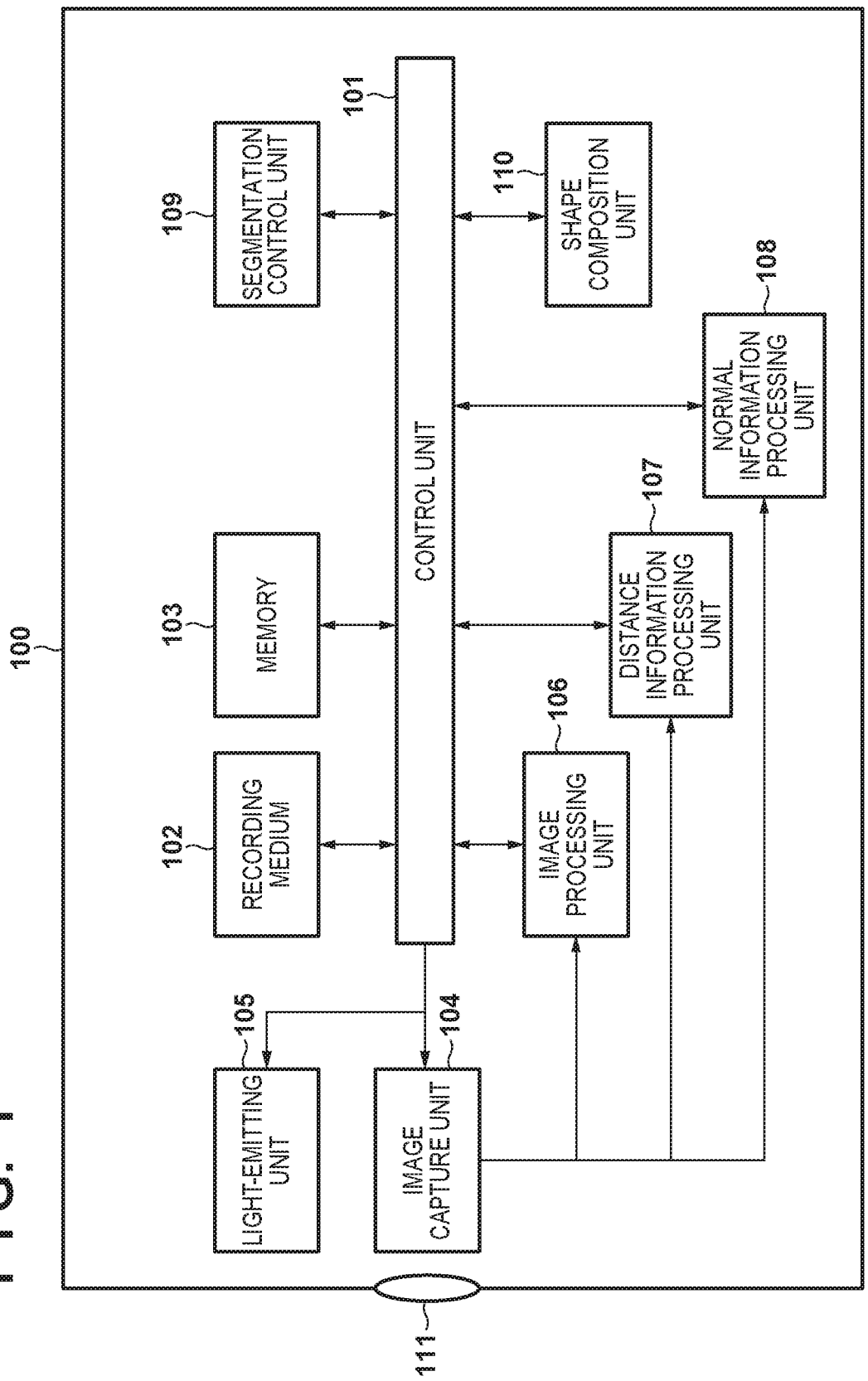
FIG. 1 is a block diagram illustrating a functional configuration of a digital camera 100, pertaining to embodiments of the present invention.

FIG. 1 is a block diagram illustrating a functional configuration of a digital camera 100, pertaining to embodiments of the present invention.

A control unit 101 is a microcomputer, for example, and controls operations of blocks included in the digital camera 100. Specifically, the control unit 101 controls the operations of the blocks by reading out operation programs for the blocks stored in a recording medium 102, for example, and by expanding and executing the operation programs on a memory 103.

The recording medium 102 is a non-volatile memory, for example, and stores parameters and the like that are necessary for the operations of the blocks, in addition to the operation programs for the blocks. On the other hand, the memory 103 is a recording device, such as a volatile memory, that is used as a working area or used for temporary storage of information. The memory 103 is used not only as the area on which the operation programs are expanded, but also as a storage area for various types of data that are output in the operation of the blocks or that need to be held during the operation of the blocks. Furthermore, the memory 103 stores information (image capture condition information) of various settings of the digital camera 100 during image capturing d parameters, etc., relating to processing to be applied.

Figure 2:
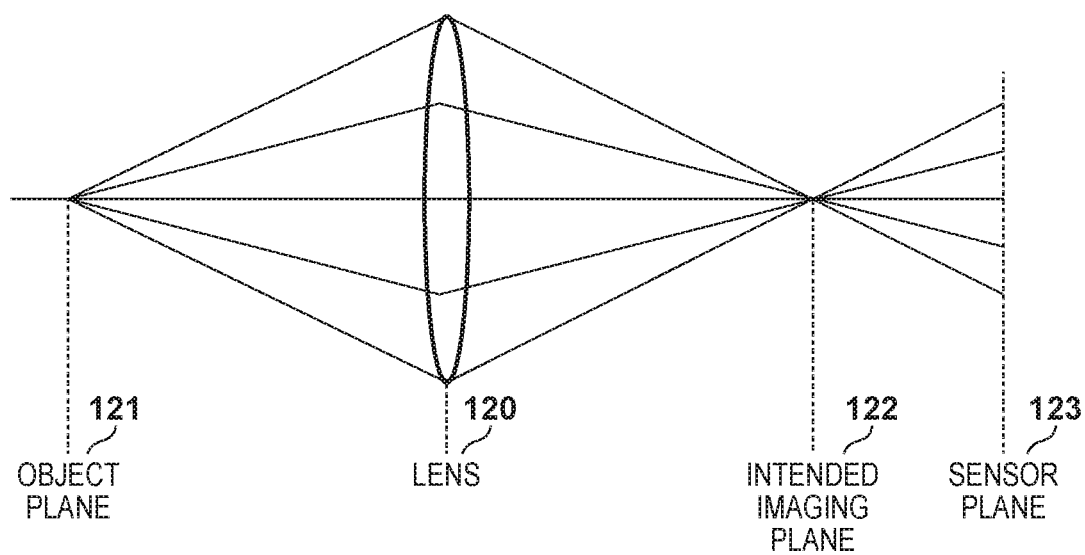
FIG. 2 is a diagram for describing an image capture optical system, pertaining to embodiments of the present invention.

An image capture unit 104 is an image sensor such as a CCD or a CMOS sensor, for example. The image capture unit 104 performs photoelectric conversion of an optical image formed on an image capture surface of the image sensor via an image capture optical system 111, and outputs an analog image signal. The output analog image signal is subjected to A/D conversion by an unillustrated A/D conversion unit, and is output as a digital image signal (referred to hereinafter simply as a captured image (two-dimensional image)). In the present embodiment, the image capture unit 104 functions as a means for acquiring information of a subject which is present in an image capture range and on which a measurement of a three-dimensional shape is performed. Here, suppose that the image capture optical system 111 and the image capture unit 104 are arranged in a relationship as illustrated in FIG. 2. In FIG. 2, light emitted from an object plane 121 of a given subject forms an image at an intended imaging plane 122 due to the function of a lens 120 in the image capture optical system 111, and is then received by a sensor plane 123 that is the light-receiving plane of the image capture unit 104. Furthermore, it is assumed that a configuration is adopted such that a light source can be added to the image capture environment during image capturing by a light-emitting unit 105, which may be a strobe, etc., emitting light.

Figure 3A:
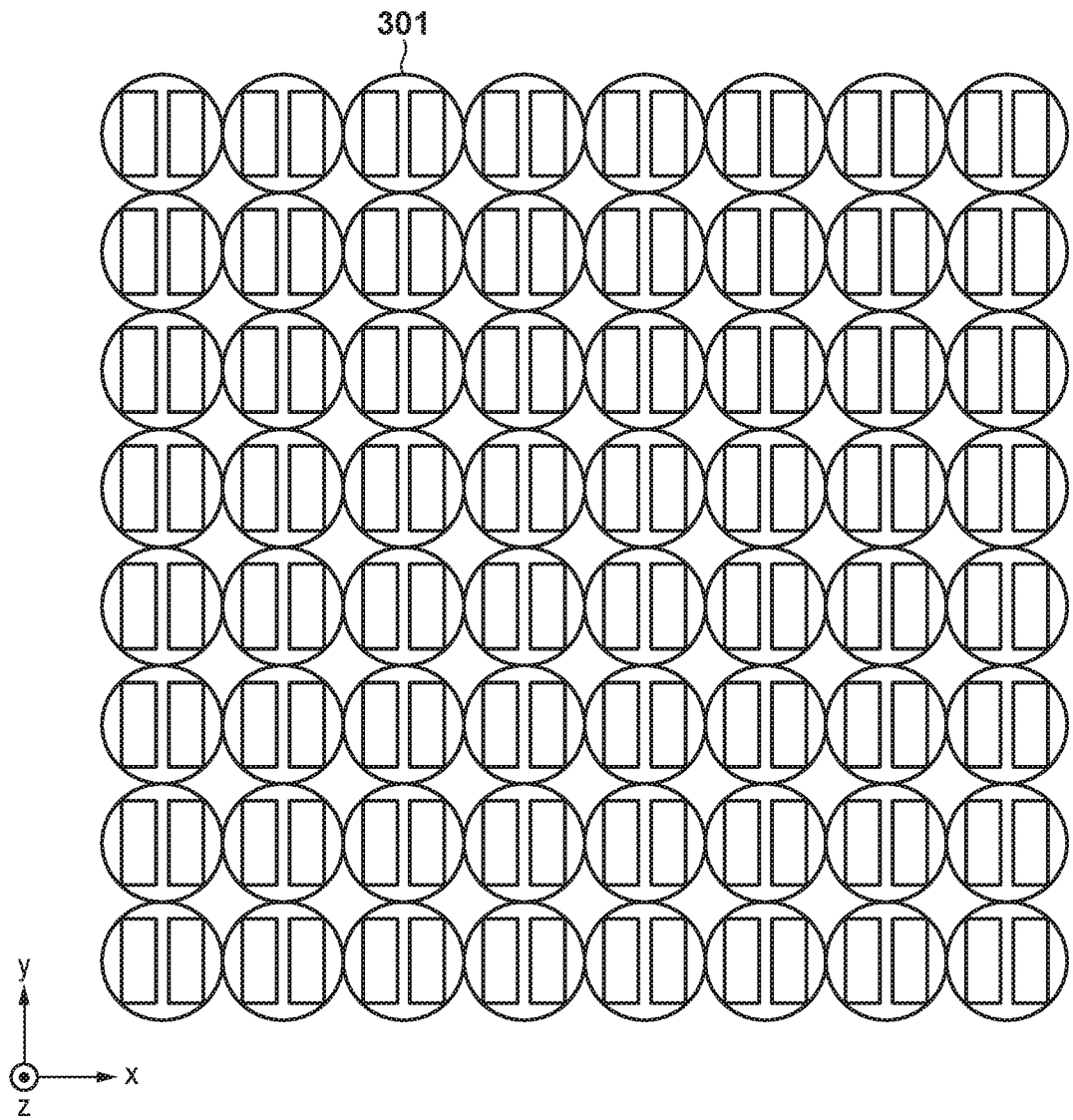
FIGS. 3A and 3B are diagrams for describing a configuration of an image capture unit 104, pertaining to embodiments of the present invention.
Figure 3B:
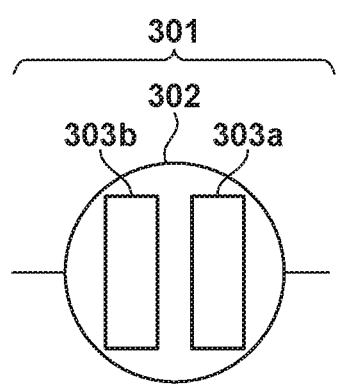

Furthermore, for use in the measurement of a three-dimensional shape of a subject, the image capture unit 104 in the present embodiment also outputs information necessary for deriving the distance between the digital camera 100 and the subject. The output of this information may be realized, for example, by the image capture unit 104 being provided with a plurality of photoelectric conversion units in each of the two-dimensionally arrayed pixels in the image sensor, as illustrated in FIG. 3A. In more detail, as illustrated in FIG. 3B, in which the configuration of a single pixel 301 of the image sensor is shown in enlarged state, a single pixel is constituted of a microlens 302 and a pair of photoelectric conversion units 303a and 303b. With such a configuration, pupil division is realized by a flux of light entering each pixel being received by each of the photoelectric conversion units 303a and 303b due to the function of the microlens 302, and when image capturing is performed once, a group of captured images (an A image and a B image) for incident fluxes of light from two directions can be acquired. Here, it is assumed that the A image indicates an image acquired by incident fluxes of light being photoelectrically converted by the group of photoelectric conversion units 303a included in the image capture unit 104, and the B image indicates an image acquired by incident fluxes of light being photoelectrically converted by the group of photoelectric conversion units 303b included in the image capture unit 104. Accordingly, the A image and B image forming a pair acquired when image capturing is performed once have the relationship of a group of images acquired by image capturing a subject from different directions in the same image capture conditions, and as described later, the distance between the digital camera 100 and the subject can be derived from the difference between these images. Note that the captured image mentioned above corresponds to an image (AB image; an image reproducing a state in which pupil division is not performed) that can be acquired by synthesizing the pair of the A image and the B image (pupil division images; a group of images with parallax).

Furthermore, in the present embodiment, a description is provided assuming that an image sensor having a structure as illustrated in FIG. 3 is adopted so that the image capture unit 104 can output information necessary for deriving the distance between the digital camera 100 and a subject. However, the present invention does not necessarily have to be implemented in this manner. Needless to say, the technique used to derive the distance between the digital camera 100 and a subject can be replaced with another technique, such as a technique of measuring the distance by using a laser range finder, etc., or a technique of deriving the distance through triangulation by using a binocular image capture device.

Hence, the image capture unit 104 in the present embodiment outputs a captured image and a group of images with parallax, for the measurement of a three-dimensional shape of a subject. Note that, in a form in which a group of a plurality of captured images acquired by performing image capturing while changing conditions of the photography environment are used in order to derive normals of a subject, a corresponding number of captured images and image groups with parallax are output, as described in detail later.

An image processing unit 106 acquires the captured image output by the image capture unit 104, and stores the captured image to the memory 103. Besides this, the image processing unit 106 executes various types of image processing on the captured image, such as conversion of the captured image into a luminance image.

A distance information processing unit 107 generates distance information based on the acquired group of images with parallax. The distance information has a pixel structure corresponding to the captured image, and includes subject distances and information necessary for deriving the subject distances. If the generation of the distance information is performed based on a group of images with parallax (an A image and a B image) as in the present embodiment, the distance information may include the values derived in the following, for example.

Figure 4A:
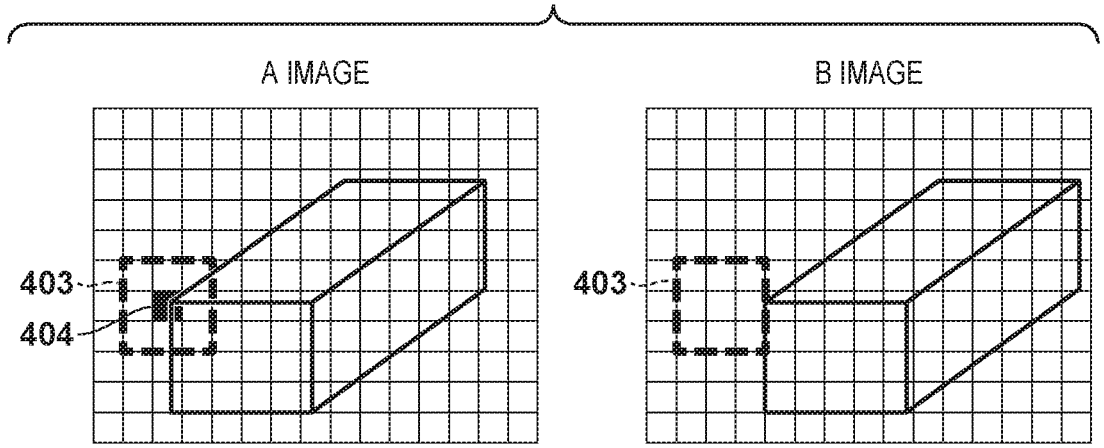
FIGS. 4A and 4B are diagrams for describing the generation of distance information, pertaining to embodiments of the present invention.

The information included in the distance information may be an image shift amount of each pixel in an A image and a B image. The derivation of an image shift amount includes, as illustrated in FIG. 4A, processing performed by dividing an A image 401 and a B image 402 into extremely-small blocks 403 indicated by broken lines, for example. For example, if each pixel in the A image 401 to be processed is defined as a target pixel 404, the extremely-small block 403 may be set to a region of a predetermined size with the pixel at the center. Note that while the extremely-small block 403 is set to a 3×3 pixel square region with the target pixel 404 at the center in the example illustrated in FIG. 4A, the extremely-small block 403 may have any shape or size. Furthermore, the extremely-small block 403 is set for each target pixel 404, and the extremely-small blocks 403 for different target pixels 404 may overlap with one another.

For example, when extremely-small blocks 403 are set with respect to pixels of the A image and the B image, correlation computation processing is performed between the images for each pixel (target pixel 404), and a shift amount (image shift amount) of an image included in the extremely-small blocks 403 corresponding to the pixel is derived. If the data count (the number of pixels) of (a pair of) extremely-small blocks 403 set with respect to a target pixel 404 at the same position in the A image and the B image is m, pixel data of the pair of extremely-small blocks 403 are expressed as E(1) to E(m) and F(1) to F(m). In this case, when denoting the shift amount (of data) as k pixels (where k is an integer), the correlation amount C(k) can be calculated by using the following expression in the correlation computation.

$$C(k)=\Sigma|E(n)-F(n+k)|$$

Figure 4B:
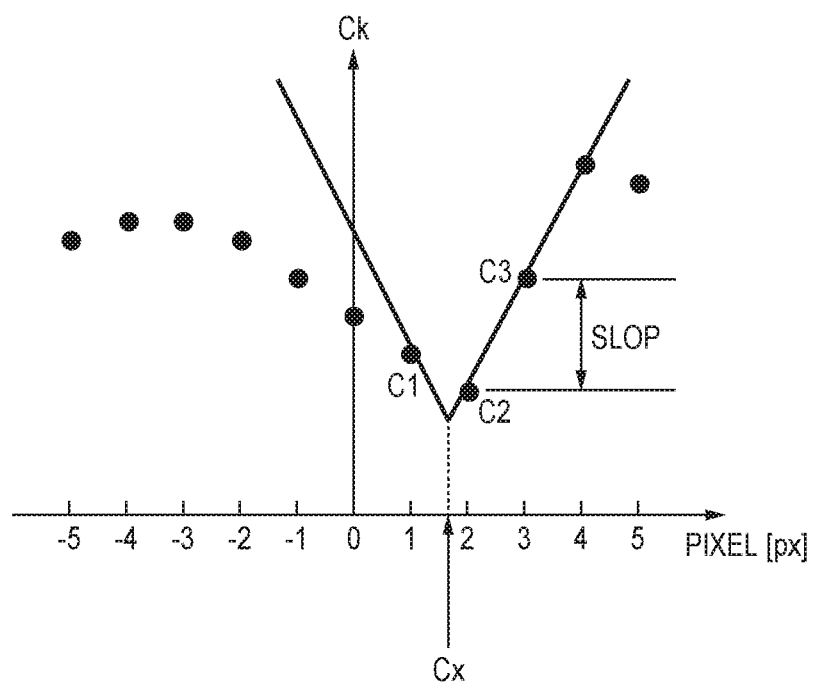

Here, suppose that the computation is performed for n, and n and (n+k) are limited to a value within the range between 1 and m. Furthermore, the shift amount k is a relative shift amount expressed in units of the detection pitch of the pair of image data. In such a manner, when a correlation amount is derived for a pair of pupil division images (the pair of extremely-small blocks 403) for a single target pixel 404, the relation between the shift amount k and the correlation amount C(k) would be as discretely illustrated in the graph in FIG. 4B, for example. Here, the correlation amount C(k) will take the smallest value for an image shift amount at which the correlation is highest. Due to this, an image shift amount x that gives the minimum value C(x) of the continuous correlation amount is derived by using the following three-point interpolation technique.

$$x=kj+D/\text{SLOP}$$

$$C(x)=C(kj)-|D|$$

$$D=\{C(kj-1)-C(kj+1)\}/2$$

$$\text{SLOP}=\text{MAX}\{C(kj+1)-C(kj),C(kj-1)-C(kj)\}$$

Here, kj is the shift amount k at which the discrete correlation amount C(k) takes the smallest value. The x calculated in such a manner is included in the distance information as an image shift amount in one target pixel 404. Note that the image shift amount x is also expressed in units of pixels.

Figure 5:
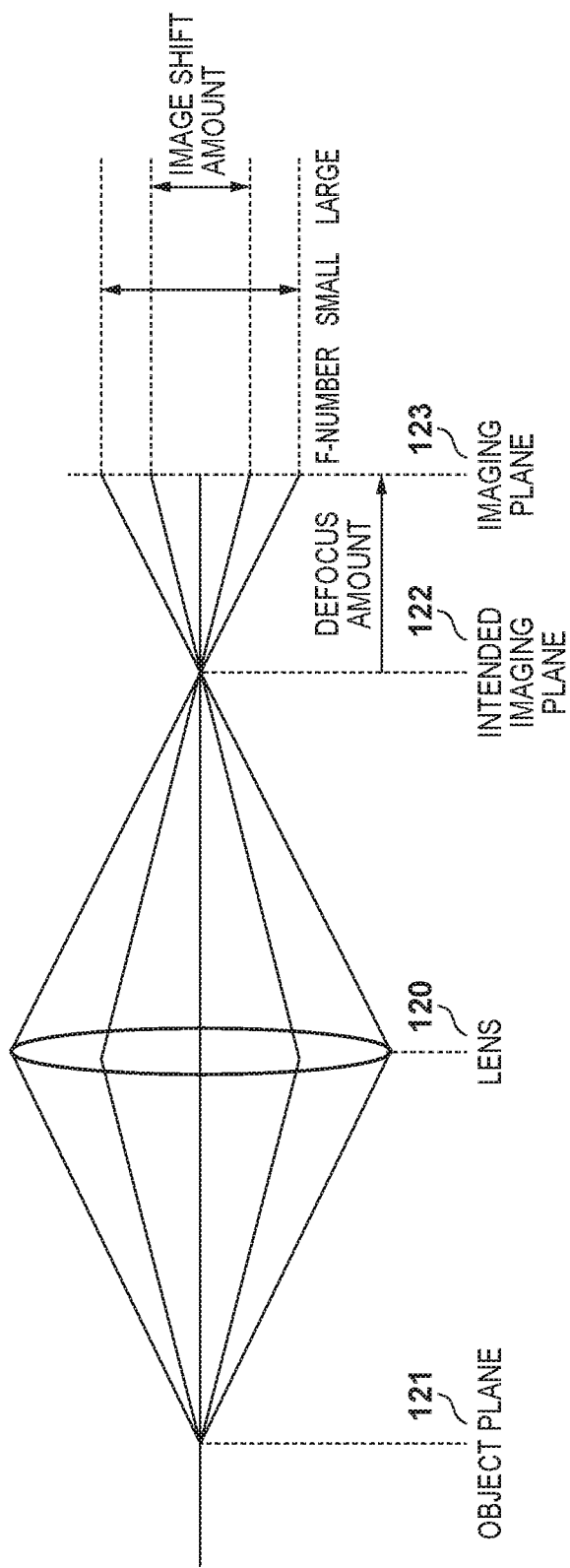
FIG. 5 is another diagram for describing the generation of the distance information, pertaining to embodiments of the present invention.

Furthermore, as illustrated in FIG. 5, the information included in the distance information may be a defocus amount indicating the difference between the sensor plane 123 and the intended imaging plane 122, which is the plane at which fluxes of light from the object plane 121 form an image via the lens 120. The defocus amount DEF at each target pixel 404 can be derived with the following expression using the image shift amount x.

$$\text{DEF}=KX\cdot PY\cdot x$$

Here, PY is the pixel pitch (the distance between pixels constituting the image sensor; in the unit of [min/pixel]) of the image sensor, and KX is a conversion coefficient that is dependent upon the size of an opening angle of centroids of fluxes of light passing through a pair of range-finding pupils. Note that the size of the opening angle of the centroids of the fluxes of light passing through the pair of range-finding pupils changes depending upon the aperture diaphragm size (f-number) of the lens. Due to this, it is assumed that the opening angle is determined in accordance with the information of the settings during image capturing. As illustrated in FIG. 5, even if the defocus amount is the same, the image shift amount x at the sensor plane 123 would be smaller for a larger f-number i.e., in a closed state) and would be larger for a smaller f-number (i.e., in an open state). Due to this, it necessary to use a value KX that is in accordance with the f-number in deriving the defocus amount.

In such a manner, by repeatedly performing calculation while shifting the target pixel position one pixel at a time, the defocus amount of a subject at each pixel in the captured image can be calculated.

Furthermore, a subject distance (denoted as "length") indicating the actual distance of a subject appearing in each target pixel 404 from the sensor plane 123 can be derived with the following expression using the defocus amount DEF derived in such a manner.

dist=1/(1/(dist_d+DEF)−1/f)

z=length−dist

Here, dist is the distance to the subject from an object principal point of the lens 120 of the image capture optical system 111, dist_d is the distance to the sensor plane 123 from an image principal point of the lens 120, and f is the focal length that was set during image capturing of the pair of (the group of) pupil division images.

Once the distance information processing unit 107 generates the distance information by performing various types of computation in such a manner, the distance information processing unit 107 stores the distance information to the memory 103.

A normal information processing unit 108 generates normal information based on a plurality of captured images output from the image capture unit 104 or luminance images yielded by converting the captured images. The normal information has a pixel structure corresponding to the captured images, and stores a normal vector of a subject appearing in each pixel. In the present embodiment, the normal information processing unit 108 is described as deriving the normal information (or surface normal information) by using the known illuminance difference stereo method, taking measurement accuracy into consideration.

Figure 6:
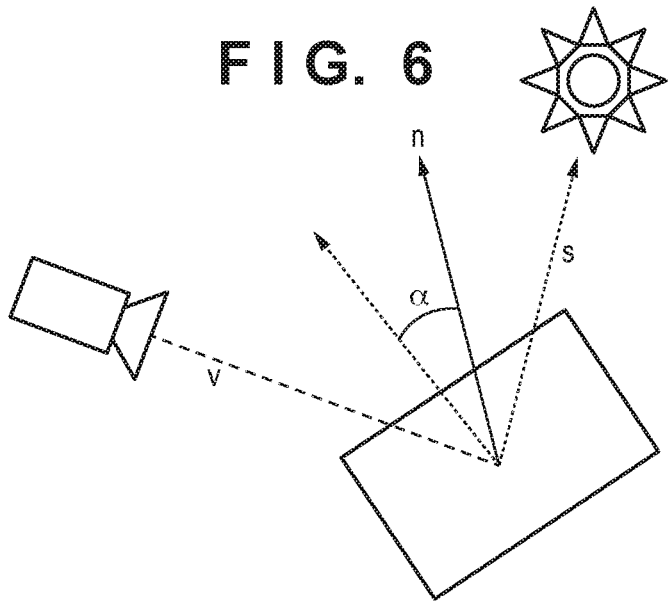
FIG. 6 is another diagram for describing the generation of normal information, pertaining to embodiment 1 of the present invention.

The illuminance difference stereo method is a method in which an assumption is made of the reflection properties of a subject based on surface normals of the subject and a direction (a light source direction) from the subject to a light source, and surface normal information is calculated from the reflection properties assumed and luminance information of the subject for a plurality of light source positions. If reflectance is not uniquely determined when a predetermined surface normal and a light source position are given, it suffices to approximate the reflection properties by using the Lambertian reflection model, which is in accordance with Lambert's cosine law. As illustrated in FIG. 6, the specular reflection component is dependent upon the angle α formed between a surface normal vector n and a bisector between a light source vector s and a line-of-sight direction vector v. Accordingly, the reflection properties may be properties based on a line-of-sight direction. Furthermore, the influence of light sources, such as ambient light, other than a designated light source on the luminance information may be removed by image capturing a subject with the light source on and with the light source off and determining the difference between the captured images.

In the following, a case in which the assumption of the reflection properties is performed by using the Lambertian reflection model will be described. When the Lambertian diffuse reflectance of an object is pd, the intensity of incident light is E, a unit vector (a light source direction vector) indicating the direction from the object to a light source is s, and a unit surface normal vector of the object is n, the luminance i of reflected light can be expressed by using the expression in Math. 1 according to Lambert's cosine law $$\begin{bmatrix} i_1 \\ \vdots \\ i_M \end{bmatrix} = \begin{bmatrix} s_1^T \\ \vdots \\ s_M^T \end{bmatrix} E\rho_d \cdot n \qquad [\text{Math. 2}]$$

Furthermore, when denoting components of M (M≥3) different light source vectors as $s_1, s_2, \ldots, s_M$ and luminance values for the respective light source vector components as $i_1, i_2, \ldots, i_M$, the expression in Math. 1 can be converted into the expression in Math. 2.

$$i = E\rho_d s \cdot n \qquad [\text{Math. 1}]$$

In the expression after conversion, the left side is a luminance vector with M rows and 1 column, $[s_1^T, s_2^T, \ldots, s_M^T]$ on the right side is an incident light matrix S that has M rows and 3 columns and indicates the light source directions, and n on the right side is a unit surface normal vector with 3 rows and 1 column. Accordingly, if M=3, $E\rho_d \cdot n$ can be rewritten into the expression in Math. 3 by using the inverse matrix $S^{-1}$ of the incident light matrix S.

$$E\rho_d \cdot n = S^{-1} \begin{bmatrix} i_1 \\ \vdots \\ i_M \end{bmatrix} \qquad [\text{Math. 3}]$$

The norm of the vector on the left side of the expression in Math. 3 is the product of incident light intensity E and the Lambertian diffuse reflectance $\rho_d$. Due to this, a normalized vector is obtained as a surface normal vector of the object as a result of calculation. That is, the incident light intensity E and the Lambertian diffuse reflectance $\rho_d$ appear only in the form of a product in the conditional expression, and thus, when $E\rho_d$ is regarded as one variable, the expression in Math. 3 can be regarded as simultaneous equations for determining three unknown variables consisting of the variable $E\rho_d$ and the 2-degree-of-freedom unit surface normal vector n. Accordingly, the variables can be determined by acquiring luminance information by using at least three light sources. Note that there would be no inverse matrix if the incident light matrix S is not a regular matrix. Due to this, the components $s_1$ to $s_3$ of the incident light matrix S need to be selected so that the incident light matrix S is a regular matrix. That is, it is desirable for the component $s_3$ to be selected to be linearly independent from the components $s_1$ and $s_2$.

Furthermore, if M>3, the number of conditional expressions obtained would be more than the number of unknown variables to be calculated. In this case, it thus suffices to calculate the unit surface normal vector n in a similar manner as in the case in which M=3 from three conditional expressions selected as desired. If four or more conditional expressions are used, the incident light matrix S would no longer be a regular matrix. Thus, in this case, approximate solutions may be calculated by using the Moore-Penrose pseudoinverse matrix, for example. Furthermore, the unit surface normal vector n may be calculated by using a fitting technique or an optimization technique.

If the assumption of the reflection properties of a subject is performed by using a model other than the Lambertian reflection model, conditional expressions may differ from linear equations for components of the unit surface normal vector n. In such a case, a fitting technique or an optimization technique can be used provided that the number of conditional expressions acquired is no less than the number of unknown variables.

Furthermore, if M>3, the number of conditional expressions acquired would be no less than three and no more than M−1. Do to this, in this case, a plurality of candidate solutions of the unit surface normal vector n can be calculated. In this case, it suffices to select a solution from among the plurality of candidate solutions by additionally using another condition. For example, the continuity of the unit surface normal vector n can be used as a condition. In a case in which the unit surface normal vector n is calculated for each pixel of an image capture device, if the surface normal vector at pixel (x, y) is n(x, y) and n(x−1, y) is already known, it suffices to select a solution for which the evaluation function expressed by the expression in Math. 4 below takes the smallest value.

$$1 - n(x,y) \cdot n(x-1,y) \qquad \text{[Math. 4]}$$

Furthermore, if n(x+1, y) and n(x, y+1) are also already known, it suffices to select a solution for which the expression in Math. 5 below takes the smallest value.

$$4 - n(x,y) \cdot n(x-1,y) - n(x,y) \cdot n(x+1,y) - n(x,y) \cdot n(x,y-1) - n(x,y) \cdot n(x,y+1) \qquad \text{[Math. 5]}$$

if there is no known surface normal and if there is an uncertainty of surface normals at all pixel positions, a solution of the expression in Math. 6 below may be selected so that the sum of the expression in Math. 5 at all pixels takes the smallest value.

$$\Sigma_{x,y}\{4 - n(x,y) \cdot n(x-1,y) - n(x,y) \cdot n(x+1,y) - n(x,y) \cdot n(x,y-1) - n(x,y) \cdot n(x,y+1)\} \qquad \text{[Math. 6]}$$

Note that a surface normal at a pixel other than the closest pixel may be used, and an evaluation function in which weighting is provided in accordance with the distance from the pixel position of interest may be used.

Furthermore, the luminance information at a desired light source position may be used as the other condition, in diffuse reflection models represented by the Lambertian reflection model, the luminance of reflected light increases as the distance between the unit surface normal vector and the light source direction vector decreases. Accordingly, a unit surface normal vector can be determined by selecting a solution that is close to a light source direction vector yielding the greatest luminance value among luminance values at the plurality of light source directions.

Furthermore, in a specular reflection model, the expression in Math. 7 below holds true when denoting a light source vector as s and denoting a unit vector (a camera line-of-sight vector) in a direction from an object toward a camera as v.

$$s + v = 2(v \cdot n)n \qquad \text{[Math. 7]}$$

As indicated by the expression in Math. 7, a unit surface normal vector n can be calculated if the light source direction vector s and the camera line-of-sight vector v are already known. Even in the case of specular reflection, the emission angle would have a spread if the surface is rough. However, the emission angles would spread out near the solution calculated regarding that the surface is smooth. Due to this, it suffices to select, from among the plurality of candidate solutions, the candidate that is closest to the solution for the smooth surface. Furthermore, the true solution may be determined by calculating an average of the plurality of candidate solutions.

In such a manner, the normal information processing unit 108 in the present embodiment can compose the normal line information based on a plurality of images captured while varying illuminance conditions. The normal information stores a unit surface normal vector for a subject appearing at each pixel position corresponding to a target captured image. The unit surface normal vector that is associated with one pixel position and stored in the normal information is a vector that has a length of one and has a value between −1 and +1 for each of the x, y, and z directions. Note that while a description is provided in the present embodiment assuming that the normal information is generated by using the illuminance difference stereo method, the manner in which the normal information is generated is not limited to this. Needless to say, an alternative technique may be used, such as a method in which the normal information is derived by using polarization information or a method in which image capturing is performed with a stripe image projected and the normal information is derived by analyzing the captured image.

Among processing performed in the digital camera 100 in the present embodiment for composing a three-dimensional shape of a subject, a segmentation control unit 109 controls processing of segmenting a captured image, distance information, normal information, etc., into processing-unit regions. As already mentioned above, while the technique as disclosed in Kadambi et al, in which a three-dimensional shape is composed by performing processing on all pixels achieves high accuracy, there are concerns that computation cost and the circuit scale necessary for computation may increase. Particularly, such computation is not practical for a form in which a lighting correction function taking three-dimensional shape into consideration is realized in a recent digital camera including an image sensor with a large number of pixels. Accordingly, in the present embodiment, the segmentation control unit 109 segments a two-dimensionally recorded image capture range into regions with a predetermine size, and realizes a reduction in computation scale.

A shape composition unit 110 performs various types of processing that are performed in the digital camera 100 in the present embodiment for the composition of a three-dimensional shape of a subject. While described in detail later, the shape composition unit 110 composes shape information indicating a three-dimensional shape of a subject based on information of the regional segmentation set by the segmentation control unit 109. Here, the shape information is two-dimensional information in which a distance (subject distance) from the sensor plane 123, i.e., a depth direction value (depth value), is stored in each pixel so as to indicate a three-dimensional shape of a subject for the measurement-target image capture range.

In the present embodiment, a description is provided regarding that processing is realized by circuits and processors corresponding to the blocks, which are included in the digital camera 100 as hardware. However, the manner in which the present invention is to be implemented is not limited to this, and processing corresponding to the blocks may be realized by programs that perform processing similar to the blocks.

Composition Processing

Figure 7:
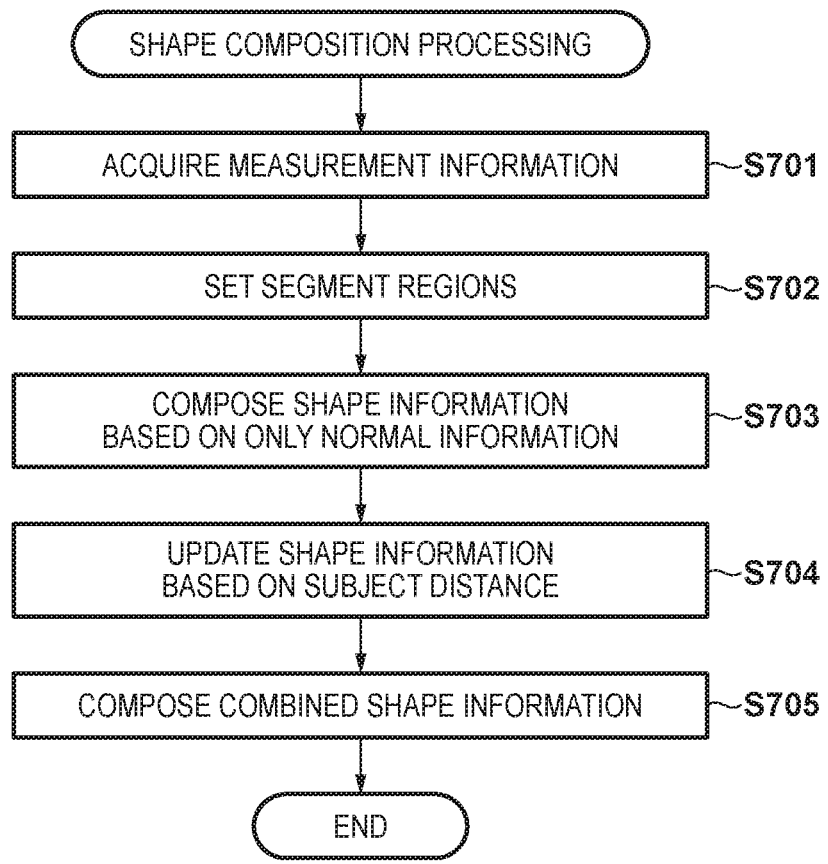
FIG. 7 is a flowchart illustrating an example of shape composition processing executed by the digital camera 100, pertaining to embodiment 1 of the present invention.

The specifics of processing will be described for the shape composition processing by the digital camera 100 in the present embodiment having such a configuration, using the flowchart in FIG. 7. Processing corresponding to this flowchart can be realized, for example, by the control unit 101 reading a corresponding processing program stored in the recording medium 102 and expanding and executing the processing program on the memory 103. This shape composition processing will be described assuming that the processing is started, for example, when image capturing (the acquisition of necessary information) is performed in a state in which a configuration has been made so that a correction taking a three-dimensional shape of a subject into consideration is applied to captured images, for example.

In S701, the control unit 101 acquires measurement information (normal information and distance information) of a subject for which a measurement of a three-dimensional shape is to be performed. In more detail, the control unit 101, while controlling the light-emitting unit 105, causes the image capture unit 104 to perform the image capturing required and to output a predetermined number of captured images (RGB color images including a pair of pupil division images). The image processing unit 106 converts captured images that are output from the image capture unit 104 and generates luminance images, and the normal information processing unit 108 generates normal information based on the luminance images. Furthermore, the distance information processing unit 107 derives image shift amounts, defocus amounts, and subject distances based on the pair of pupil division images output from the image capture unit 104, and generates distance information.

In S702, the segmentation control unit 109, by being controlled by the control unit 101, sets segment regions with respect to the measurement information. The segment regions are used as the units in which the processing of composing a three-dimensional shape is to be performed. The normal information and the distance information, which constitute the measurement information, are composed as two-dimensional information corresponding to pixels of captured images, as already mentioned above. Due to this, the segmentation control unit 109 sets the segment regions, which are the units in which processing is performed, with respect to the normal information and the distance information. In the present embodiment, the form of segmentation set with respect to the measurement information is uniform segmentation, and the segmentation control unit 109 sets the segment regions, which are the units in which processing is performed, to all have the same size. Note that the segmentation size for the uniform segmentation may be a predetermined fixed size, or may be configured so as to be changeable in accordance with image capturing settings, subject classification, etc.

In S703, the shape composition unit 110 composes, as a first shape pertaining to the present invention, shape information indicating a three-dimensional shape of a subject that is based on only the normal information, by performing processing in units of the segment regions having been set. In more detail, the three-dimensional shape of the subject based on only the normal information is composed by integrating normal information for a segment region. As already mentioned above, a three-dimensional unit surface normal vector is stored in each pixel of the normal information in the present embodiment, and the depth-direction component of the unit surface normal vector has a value within the range between −1 and +1. Due to this, a continuous three-dimensional shape can be composed for pixels within a segment region by performing integration.

Figure 8:
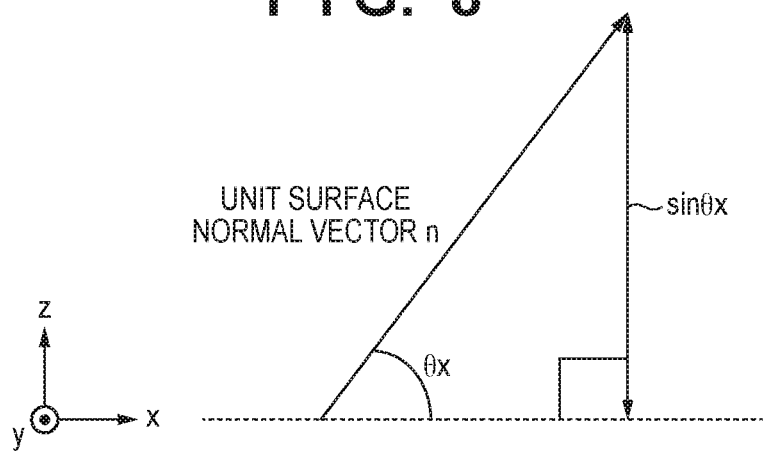
FIG. 8 is a diagram for describing a configuration of the normal information, pertaining to embodiments of the present invention.

For simplification, the following description assumes that, as illustrated in FIG. 8, a sine (sin) value of an angle $\theta_x$ that a projection vector n acquired by projecting a unit surface normal vector of a subject captured in a given pixel onto art x-z plane forms with the x axis is stored in the pixel in the normal information, That is, for simplification, the following description assumes that unit surface normal vectors do not have y-axis direction components and projection vectors n are unit vectors. Here, it is assumed that the x axis is an axis indicating a direction in the photography environment that is perpendicular to the optical axis of the image capture optical system 111 and that corresponds to the horizontal-axis direction of the sensor plane 123, and they axis is an axis indicating a direction in the photography environment that is perpendicular to the optical axis of the image capture optical system 111 and that corresponds to the vertical-axis direction of the sensor plane 123. Furthermore, it is assumed that the z axis is an axis indicating the same direction as the optical axis of the image capture optical system 111. However, it will be easily understood that unit surface normal vectors may have y-axis direction components.

Figure 9A:
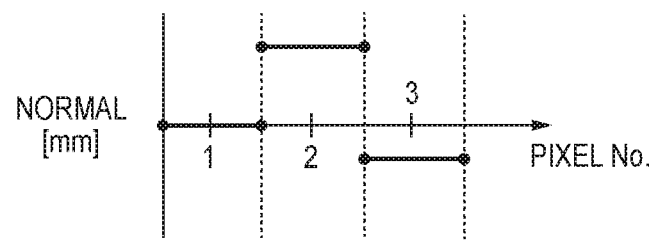
FIGS. 9A and 9B are diagrams for describing shape information composed based on only the normal information, pertaining to embodiments of the present invention.
Figure 9B:
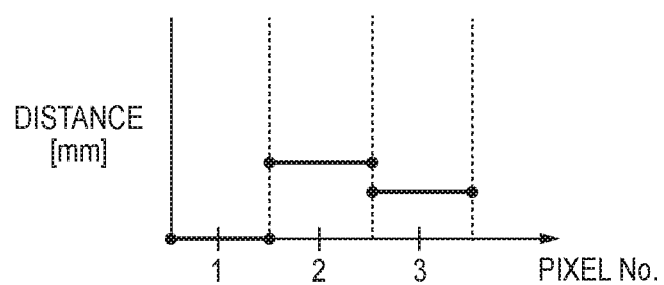

Supposing that the normal information was as illustrated in FIG. 9A (in which the horizontal axis indicates x-axis pixel positions in the target segment region, and the vertical axis indicates pixel values) in a case in which sin $\theta_x$ was used for the value of each pixel in the normal information, the shape information composed by integrating the normal information would be as illustrated in FIG. 9B. In the example in FIG. 9B, the depth values in the shape information have a range exceeding the range between −1 and +1. This is because pixel values are integrated in order from the first pixel.

Subsequently in S704, the shape composition unit 110 updates the shape information by additionally using information of subject distances in the corresponding segment region, in order to convert the three-dimensional shape of the subject based on only the normal information into a three-dimensional shape with actual dimensions, serving as a second shape pertaining to the present invention. The shape information composed in S703 is based on only the normal information, and the three-dimensional shape indicated by the shape information differs from the actual shape of the subject. Due to this, the shape composition unit 110 performs processing so that the values in the shape information match the three-dimensional shape with actual dimensions, by scaling the shape information by using the information of subject distances in the present step. Note that the processing in the present step is also performed in units of the segment regions set by the segmentation control unit 109.

In performing the scaling, the shape composition unit 110 uses the minimum value $D_{min}$ and the maximum value $D_{max}$ among the subject distances included in the distance information for the processing-target segment region, and the minimum value $R1_{min}$ and the maximum value $R1_{max}$ among the depth values included in the shape information for the same segment region. In more detail, a given pixel value (depth value) R1 in the shape information for the processing-target segment region is updated, based on the information of the subject distances for the same region, into a depth value R2 derived by using Math. 8 below $$\alpha = \frac{D_{max} - D_{min}}{R1_{max} - R1_{min}} \qquad \text{[Math. 8]}$$

$$R2 = \alpha \times R1 + D_{min}$$

In such a manner, the shape information of the processing-target segment region is updated so as to indicate a three-dimensional shape corresponding to the three-dimensional shape with actual dimensions, in accordance with the distribution of subject distances derived for the subject in the segment region. That is, in the present embodiment, a distribution of subject distances can be acquired for each small segment region, and due to this, scaling suitable for the segment region can be applied to the three-dimensional shape of the subject based on only the normal information.

Note that, due to subject distances being derived based on defocus amounts derived from a pair of pupil division images in the present embodiment, shape information that is closer to the three-dimensional shape with actual dimensions can be composed for each segment region by using the subject distances. On the other hand, even in a form in which the function as in the present embodiment of deriving subject distances in units of pixels is not included, a value that is simply derived from the following expression based on the conditions during image capturing and the configuration of the image capture unit 104 may be used as the scaling factor (magnification) a multiplied with R1 in Math. 8.

$$\alpha = g \times p / f$$

Here, g indicates the pixel pitch in the image capture unit 104, p indicates the distance from the sensor plane 123 to a subject (focus plane) that was in focus during image capturing, and f indicates the focal length of the image capture optical system 111 during image capturing. Since a single value of p can be specified from the state of the image capture optical system 111 during image capturing, the same magnification α is uniformly applied to all segment regions. With the form in which a magnification α that is simply calculated in such a manner is used, while it is impossible to compose a three-dimensional shape having an accuracy higher than that of a three-dimensional composed by using the magnification α derived for each segment region using Math. 8 in the present embodiment, an increase in efficiency in terms of computation cost can be expected because processing for deriving the magnification α for each region becomes unnecessary.

Incidentally, depending upon the distribution of subjects in the photographed range, the shape information acquired when scaling is performed for each segment region in such a manner may not be suitable due to a difference present in subject distances between adjacent segment regions. That is, due to processing being performed for each segment region, there is a possibility that continuity cannot be guaranteed even between pieces of shape information corresponding to adjacent segment regions due to a depth-direction level difference occurring at a connection part, especially if segment regions include subjects with a difference in distance, such as a foreground and a background. Accordingly, the shape composition processing in the present embodiment may include processing for preventing such an unnatural three-dimensional shape from being composed, by changing the magnification α applied when shape information is updated using information of subject distances.

In other words, the shape composition unit 110 determines the magnification α indicated in Math. 8 in accordance with the distribution of subject distances in a segment region, and thus, the magnification α, would take a different value for each segment region. Even if such a magnification α is independently applied to each segment region in the updating of shape information, there is a possibility of emergence of a part at which continuity in three-dimensional shape cannot be guaranteed between adjacent segment regions. Accordingly, for each segment region, the subject distance at a boundary part with an adjacent other segment region may be taken into consideration, and the magnification α may be corrected into the following magnification γ and be used for scaling.

Figure 10A:
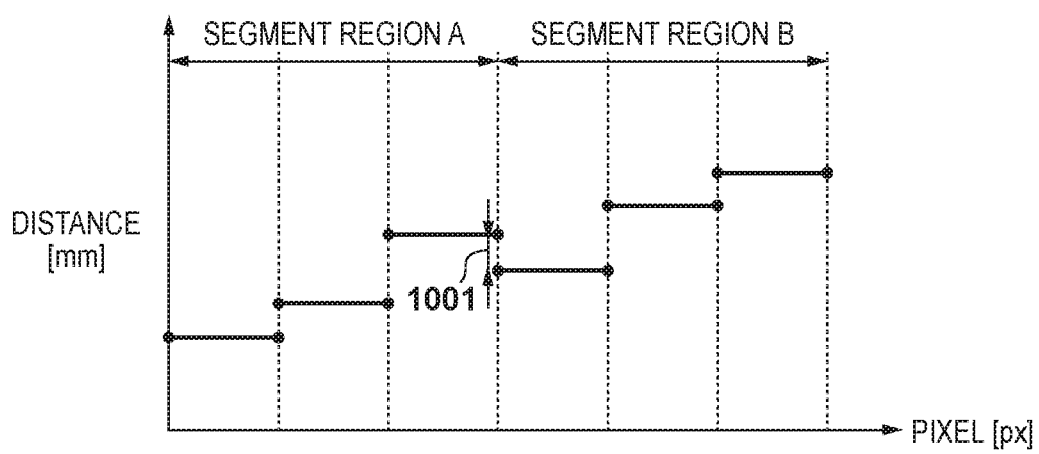
FIGS. 10A and 10B are diagrams for describing scaling processing for the composition of shape information, pertaining to embodiment 1 of the present invention.

For example, suppose that, as illustrated in FIG. 10A, a discontinuous level difference is formed in the shape information R2 updated based on Math. 8 at a boundary part between adjacent segment regions A and B. That is, if a difference 1001 formed between a pixel $R2_{Aedge}$ at a boundary part of the segment region A and a pixel $R2_{Bedge}$ at the boundary part of the segment region B is a difference for which a determination would be made that a three-dimensional shape is not continuous between the segment regions, it can be said that the scaling performed using the magnification α is not suitable. Due to this, a difference e to be taken into consideration when scaling is performed is derived by using Math. 9 below, in order to reduce such a level difference 1001.

$$e = \frac{R2_{Bedge} - R2_{Aedge}}{R1 \times (f/g)} - p \qquad \text{[Math. 9]}$$

Taking such a difference e into consideration, an appropriate magnification to be used in updating the shape information for the processing-target segment region A can be derived as $$\beta_A = g \times (p - e) / f.$$

Figure 11A:
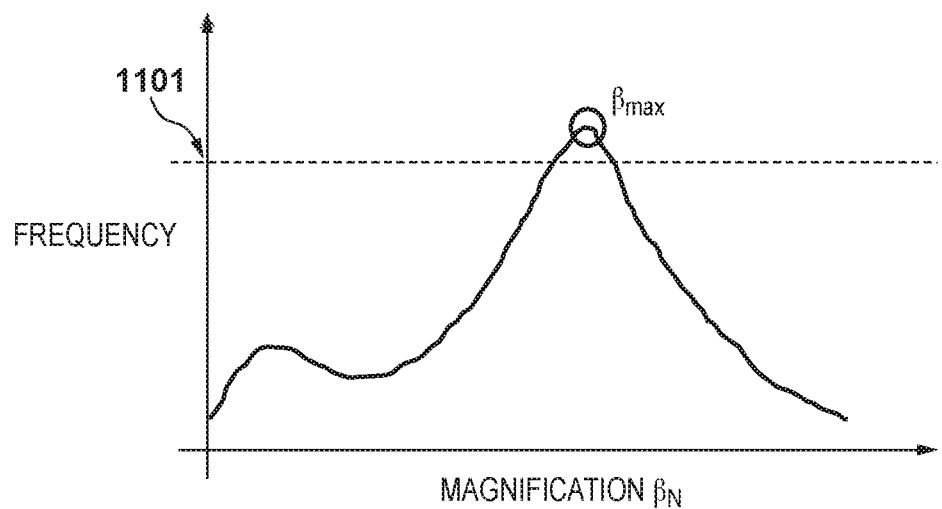
FIGS. 11A and 11B are other diagrams for describing scaling processing for the composition of the shape information, pertaining to embodiment 1 of the present invention.

Furthermore, the reduction of level differences can be realized by collecting the magnifications $\beta_N$ (where N is a value between 1 and the number of segment regions) derived for all segment regions and selecting a representative value γ among these magnifications $\beta_N$ and using the representative value γ in place of the magnification α for scaling. For example, the representative value γ may be selected, as illustrated in FIG. 11A, by referring to a histogram of magnifications $\beta_N$ derived for all segment regions and selecting $\beta_{max}$ having the highest frequency within a range in which the frequency exceeded a threshold 1101.

Figure 11B:
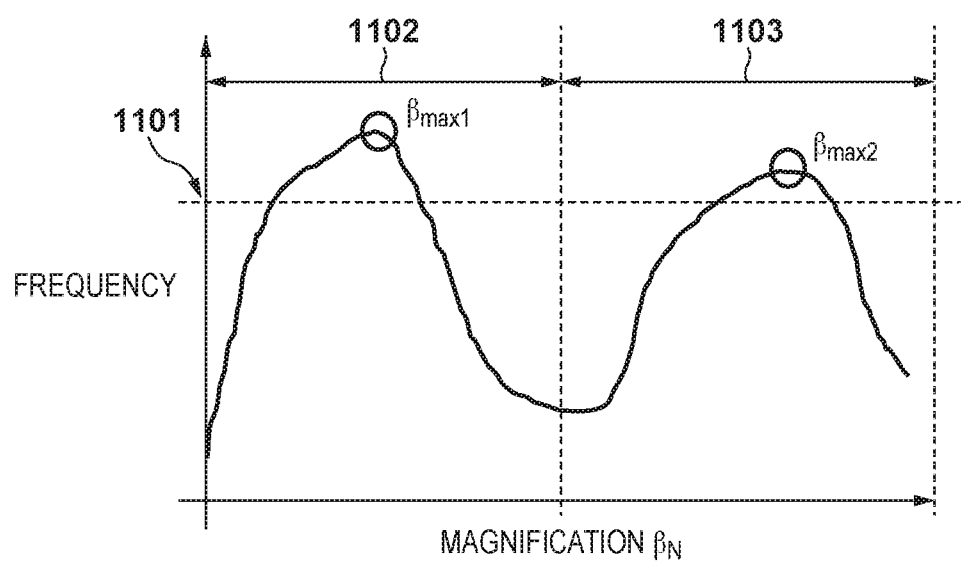

Alternatively, if there are a plurality of magnifications $\beta_N$ with frequencies higher than the threshold 1101 as illustrated in FIG. 11B, for example, a plurality of representative values γ may be set and a determination of which representative value γ is to be used may be performed in accordance with the magnification $\beta_N$ derived for each segment region. In the example in FIG. 11B, $\beta_{max1}$ and $\beta_{max2}$ each having the highest frequency within ranges in which the frequency exceeded the threshold 1101 respectively become representative values $\gamma_1$ and $\gamma_2$. It suffices to determine which representative value is to be applied to a segment region by setting ranges 1102 and 1103 with regard to the magnifications $\beta_N$ by using the intermediate value between $\gamma_1$ and $\gamma_2$ as a threshold, for example, and performing the determination in accordance with which of the ranges the magnification $\beta_N$ derived for each segment region belongs to. That is, for a segment region for which a magnification $\beta_N$ included within the range 1102 has been derived, the magnification $\gamma_1$ that is a representative value is used for scaling, and for a segment region for which a magnification $\beta_N$ included within the range 1103 has been derived, the magnification $\gamma_2$ that is a representative value is used for scaling.

Note that the method of determining a magnification γ to be set as a representative value by using a histogram may increase computation load. Due to this, a method may be adopted in which the average of magnifications $\beta_N$ derived for all segment regions is simply used. Alternatively, the distribution of a focusing state of a subject in a captured image differs depending upon photography conditions, and normal information and distance information derived may have low accuracy for some segment regions. Due to this, a method may be adopted in which the magnification to be adopted as the representative value is determined by using only magnifications $\beta_N$ derived for segment regions including a subject image included within a focusing range, for example.

Similarly, a method may be adopted in which, by setting reliability degrees to a captured image, distance information, and normal information as described in the following, for example, the magnification $\gamma$ to be adopted as the representative value is determined by using only magnifications $\beta_N$ derived for segment regions to which a reliability degree exceeding a threshold is set. That is, a magnification $\beta_N$ derived for a segment region whose reliability degree does not exceed a threshold may be excluded from the candidates from which the magnification $\gamma$ that is the representative value is to be determined.

(1) Reliability Degree of Captured Image

A reliability degree L of a captured image may be derived based on luminance information of the image. For example, if luminance values Lp of a captured image are expressed with a ranges of values between 0 and LM, the reliability degree L may be set so that, with the intermediate value Lm (=LM/2) of luminance values set as the central value, the reliability degree L becomes lower as the luminance value becomes higher (as brightness increases) within a range higher than the intermediate value. Contrariwise, the reliability degree L may be set so that the reliability degree L becomes lower as the luminance value becomes lower (as darkness increases) within a range lower than the intermediate value. By adopting such a configuration, the possibility can be decreased of a magnification $\beta_N$ for a segment region including a pixel with saturated luminance or a blocked-up pixel being selected, by making the reliability degree L low for such a segment region. Note that the captured image reliability degree L of a segment region can be derived by calculating $$L=-|Lm-Lp|$$

for each pixel included in the segment region, and setting the average or the sum of the values, for example, as the final reliability degree of the segment region.

(2) Reliability Degree of Distance Information

A reliability degree D of distance information may be derived based on the defocus amount DEF indicating the focus state. As already mentioned above, the subject distance can be derived based on the defocus amount DEF. However, the greater the absolute value of the defocus amount DEF, the more blurred a subject image in the corresponding pixel becomes, and thus the range-finding accuracy decreases. Due to this, the distance information reliability degree D of a segment region can be derived by calculating $$D=|DEF|$$

for each pixel included in the segment region, and setting the average or the sum of the values, for example, as the final reliability degree of the segment region.

(3) Reliability Degree of Normal Information

A reliability degree N of normal information may be derived based on a ratio between the number Pin of captured images captured upon the derivation of normals and the number P of captured images actually used for the derivation of normal information. In the form described above in which the illuminance difference stereo method is used, a plurality of captured images captured while changing the position of the light source are referred to, and based on the change in luminance of each pixel, the surface normal vector for the pixel is derived. However, a region (an occlusion region) in which luminance is decreased due to the shadow of a subject occurs depending upon the positional relationship between the light source and the subject, and thus, there is a possibility that suitable normal information cannot be acquired if a pixel in the region is referred to. Due to this, the normal information processing unit 108 in the present embodiment avoids the deviation of normal information from reality by performing control such that a pixel in which a shadow of a subject has occurred is not referred to during the derivation of normal information. On the other hand, a decrease in the number of pixels referred to in the derivation of normal information also leads to a decrease in derivation accuracy. Thus, in the present embodiment, the normal information reliability degree N is derived as $$N=P/Pm.$$

Note that it suffices to adopt, as the normal information reliability degree N for a segment region, the average or the sum of the reliability degrees derived for the pixels included in the segment region, for example. Also, control may be performed such that the reliability degree N is further decreased if the number of captured images in which the luminance of the corresponding pixel is saturated, among the captured images used for the derivation of normal information, exceeds a threshold.

In such a manner, a reliability degree M of a segment region is calculated by adding up the reliability degrees of the captured image, distance information, and normal information, having been derived for the segment region, and the reliability degree M of the segment region can be used for determining the magnification $\gamma$ that is the representative value. Note that, in the derivation of the reliability degree M, weighted addition in which each reliability degree is multiplied by a predetermined coefficient may be used, or the reliability degrees may be added up after each reliability degree is normalized. Furthermore, only at least one of these reliability degrees may be used, or a reliability degree derived based on a criterion other than these may be additionally used.

If a magnification $\gamma$ derived in such a manner is to be used, it suffices to update shape information as expressed by $$R2=\gamma \times R1+Dmin-e.$$

Figure 10B:
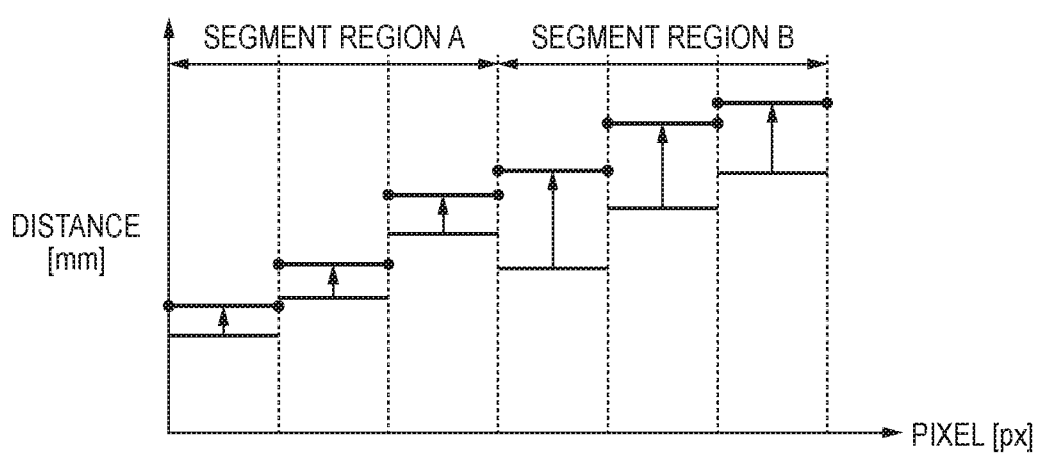

In more detail, based on the distribution of subject distances of a given segment region and subject distances in an adjacent segment region, the shape composition unit 110 can update the shape information composed based on only the normal information for the given segment region so that a suitable three-dimensional shape in which level differences are reduced is composed. That is, the discontinuous level difference 1001, which was formed in the shape information illustrated in FIG. 10A in a case in which the updating of the shape information is performed by using the magnification $\alpha$ derived by using Math. 8, is absorbed as illustrated in FIG. 10B by using the representative value as the magnification.

In S705, the shape composition unit 110 combines the shape information having been independently composed for the individual segment regions, and composes combined shape information indicating a three-dimensional shape corresponding to the entirety of a processing-target captured image. Once the shape composition unit 110 composes the combined shape information, the shape composition unit 110 associates the combined shape information with the captured image and stores the combined shape information to the recording medium 102 or the memory 103. The combined shape information acquired in such a manner indicates a three-dimensional shape of a subject included in an image capture range corresponding to the captured image. Due to this, in a case such as when an effect for virtually changing the illumination conditions is to be applied to the capture image, for example, it is possible to cause a suitable result to be output.

Note that in the present embodiment, a form has been described in which, when composing a three-dimensional shape by reflecting subject distances, an unnatural level difference formed in the depth direction of the three-dimensional shape composed is reduced by changing the scaling magnification depending upon the distribution of subject distances in segment regions. However, such change in magnification not necessarily needs to be performed. For example, the change in magnification may also be performed only if the distribution of subject distances is dynamically assessed and it is determined that a change in magnification is necessary. Alternatively, control may be performed such that the change in magnification is not performed depending upon the image capture conditions and image capture mode, for example, if a configuration has been made to reduce the time required for computation.

As described above, a three-dimensional shape with high accuracy can be composed while reducing the computation cost, according to the shape measurement device in the present embodiment. In more detail, uniformly segmented segment regions are defined with respect to a captured image in which a subject that is the target of measurement of a three-dimensional shape is captured, and processing is performed for each segment region based on normal information and distance information. Due to this, a three-dimensional shape can be composed with a predetermined circuit scale while reducing computation amount. Furthermore, if the continuity of a three-dimensional shape cannot be guaranteed at a boundary part of a segment region in a case such as when there is a difference of a certain scale in the distribution of subject distances between adjacent segment regions, the discontinuity can be suppressed by changing the scaling factor in accordance with subject distances.

Modification

In the above-described embodiment, a form has been described in which the scaling factor is changed to reduce a depth-direction discontinuity that may occur at a boundary part between segment regions when uniform segmentation is performed to compose shape information. However, the method for reducing such discontinuity at a boundary part between segment regions is not limited to this. For example, a segment region including the boundary part may be separately set, shape information may be similarly composed for this separate segment region based on normal information and subject distances, and shape information for boundary parts of a plurality of adjacent segment regions may be corrected based on this.

Figure 12A:
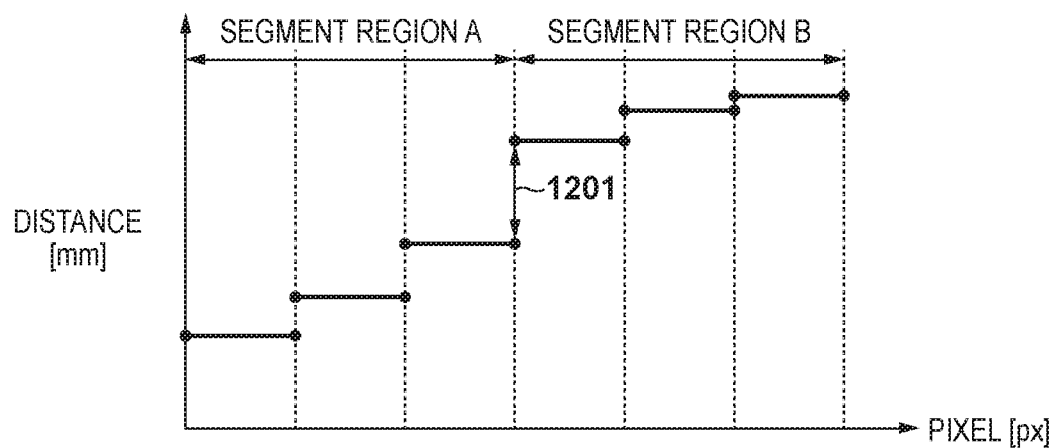
FIGS. 12A, 12B, and 12C are diagrams for describing scaling processing for the composition of the shape information, pertaining to a modification of the present invention.
Figure 12B:
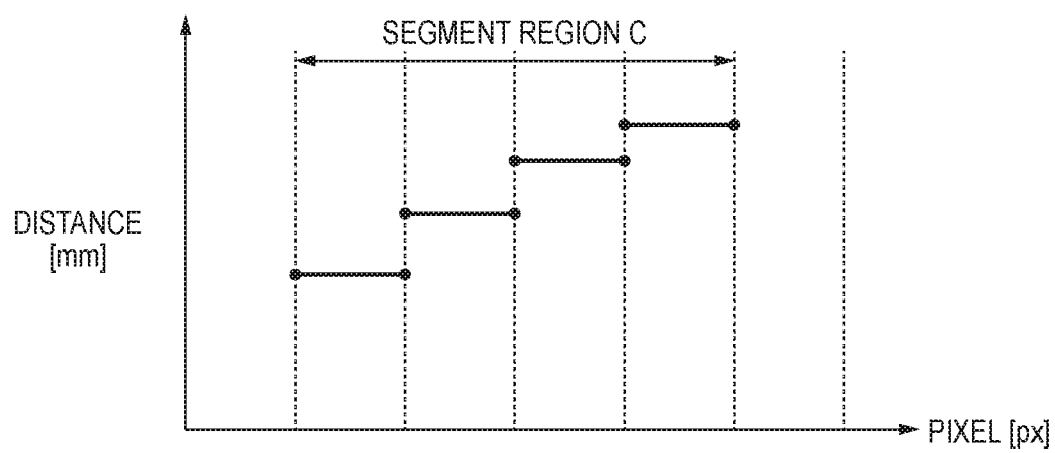
Figure 12C:
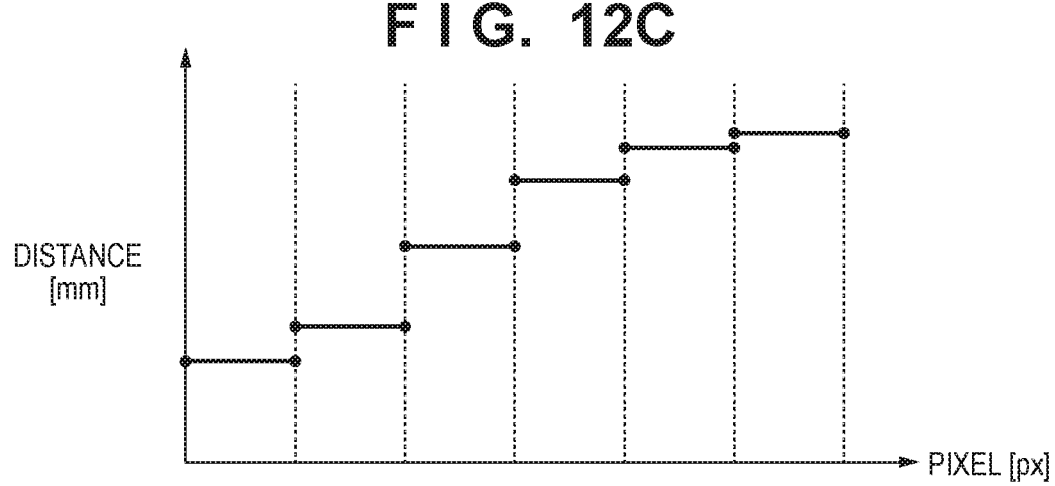

For example, an example will be considered in which, for adjacent segment regions A and B, the depth values R2 in the shape information updated by using the information of subject distances are as illustrated in FIG. 12A, and a level difference 1201 at which the continuity of a three-dimensional shape cannot be guaranteed is formed at the boundary part between the segment regions. In this case, it suffices for the segmentation control unit 109 to define a segment region C extending across the boundary part as illustrated in FIG. 12B, for example, and for the shape composition unit 110 to similarly perform, for the segment region C, the composition of partial shape information based on only normal information and the scaling based on subject distances. Consequently, partial shape information indicating a distribution of depth values as illustrated in FIG. 12B is acquired for the segment region C. Due to this, it suffices for depth values $R2_{final}$ to be derived through weighted addition expressed by $$R2_{final}=G1 \times R2_A+G2 \times R2_C$$

for pixels in the region where the segment regions A and C overlap. Here, it is assumed that $$G1+G2=1$$

holds true between the weighting coefficients G1 and G2. Furthermore, it suffices for depth values $R2_{final}$ to be similarly derived through weighted addition expressed by $$R2_{final}=G3 \times R2_B+G4 \times R2_C$$

for pixels in the region where the segment regions B and C overlap. Here, it is assumed that $$G3+G4=1$$

holds true between the weighting coefficients G3 and G4. In such a manner, by performing weighted addition by using partial shape information that is separately derived for a boundary region, shape information indicating a suitable three-dimensional shape in which the level difference 1201 that was formed between the segment regions A and B is reduced can be composed, as illustrated in FIG. 12C.

Embodiment 2

Incidentally, in embodiment 1 and the modification described above, forms have been described in which shape information is composed by processing normal information and distance information corresponding to a captured image in units of segment regions set through uniform segmentation. As already described above, however, there is a possibility of a three-dimensional shape that is not guaranteed to have continuity being composed at a boundary part of a segment region, depending upon the distribution of subject distances within segment regions and the magnification α applied in scaling, and it was necessary to perform separate computation in order to avoid this. In the present embodiment, a form will be described in which a different technique is used in the setting of segment regions by the segmentation control unit 109, so that a three-dimensional shape whose continuity is easily guaranteed can be easily composed while suppressing computation cost.

The segmentation control unit 109 in the present embodiment differs from embodiment 1 and the modification described above, and performs the setting of segment regions through non-uniform segmentation. In the present embodiment, a description is provided assuming that the setting of segment regions is performed by using one of the three following types of techniques: a technique based on only distance information (subject distances); a technique based on distance information and normal information; or a technique based on variance information of luminance in a captured image. However, the present invention is not limited to being implemented by using these segmentation techniques, and any technique in which segmentation is performed such that, if shape information composed by performing regional segmentation are combined, a three-dimensional shape guaranteed to have continuity with regard to a same single subject is exhibited. Furthermore, it goes without saying that the number of techniques adopted among these three techniques and other techniques is not limited to one, and the setting of segment regions may be performed under multiple conditions by combining two or more techniques.

Technique Based on Only Distance Information

In the following, a technique in which the segmentation control unit 109 sets segment regions based on only distance information will be described with reference to FIG. 13. FIG. 13A is a diagram (in which the horizontal axis indicates x-axis pixel positions and the vertical axis indicates subject distances) indicating distance information pixel values (subject distances) corresponding to pixels of a captured image that have a specific y coordinate and that line up in the x-axis direction. In this technique, the segmentation control unit 109 determines whether or not to segment regions between adjacent pixels in the distance information based on whether or not subject distances have a difference greater than or equal to a distance threshold $T_{L1}$ between the adjacent pixels.

Here, the distance threshold $T_{L1}$ may be a value set in order to separate a foreground and a background from one another, for example, and the median of peak values of subjects of the foreground and the background in a histogram of subject distances derived for all pixels within the image capturing range, for example, may be set as the distance threshold $T_{L1}$. Note that because the irregularity in the shape of a subject is unknown at the point of image capturing, a configuration may be adopted in which shape information reflecting subject distances are composed with segment regions set based on a plurality of types of distance thresholds, and the optimum distance threshold is derived based on whether or not a level difference that is not suitable is formed in the depth direction.

In the example in FIG. 13A, a change in subject distance is observed between pixels 1 and 2, pixels 3 and 4, pixels 5 and 6, pixels 8 and 9, and pixels 10 and 11, and among these, it is supposed that the differences of subject distances between pixels 5 and 6 and between pixels 8 and 9 exceed the distance threshold Lit. In this case, the segmentation control unit 109 sets segment regions segmented between these pixels. Due to this, segment regions 1301, 1302, and 1303 are set as illustrated in FIG. 13B.

(2) Technique Based on Distance Information and Normal Information

Next, a technique in which the segmentation control unit 109 sets segment regions based on distance information and normal information will be described with reference to FIG. 14. FIG. 14A is a diagram (in which the horizontal axis indicates target x-axis pixel positions and the vertical axis indicates pixel values at the pixel positions) indicating distance information pixel values (subject distances) and normal information pixel values (normal values; sin $\theta_x$) corresponding to pixels of a captured image that have a specific y coordinate and that line up in the x-axis direction. Similarly to the technique based on only distance information, the segmentation control unit 109 determines segmentation positions based on a comparison between a distance threshold $T_{L2}$ and the difference in subject distances between adjacent pixels in this technique. However, the distance threshold $T_{L2}$ is changed in accordance with the state of normal information of a corresponding pixel.

First, the distance threshold $T_{L2}$ is changed depending upon whether or not the absolute value of the normal value is greater than or equal to a normal threshold $T_N$, and the distance threshold $T_{L2}$ is set to a small value $T_{L2L}$ if the absolute value of the normal value falls below the normal threshold $T_N$. On the other hand, if the absolute value of the normal value is greater than or equal to the normal threshold $T_N$, the distance threshold $T_{L2}$ is set to a large value ($T_{L2H}$) within a pixel range in which normal values are continuously changing in continuous pixels (peripheral pixels). Contrariwise, the distance threshold $T_{L2}$ may be set to the value $T_{L2L}$, similarly to the case in which the absolute value of the normal value falls below the normal threshold $T_N$, for example, within a range in which normal values are not continuously changing in continuous pixels.

In the example in FIG. 14A, the absolute value of the normal value is greater than or equal to the normal threshold $T_N$ at pixels 6 and 9. In this case, normal values do no continuously change in the pixels before and after pixel 6. Due to this, the distance threshold for differences in subject distances is set to $T_{L2L}$. On the other hand, normal values continuously change in the pixels before and after pixel 9. Due to this, the distance threshold for differences in subject distances is set to $T_{L2H}$. Accordingly, with regard to the distance information, the distance threshold $T_{L2L}$ is set for pixels 1 to 8 and 10 to 12, and the distance threshold TL2I4 is set for pixel 9. Based on the thresholds set in such a manner, while a difference in subject distances exceeding the distance threshold $T_{L2L}$ can be observed between pixels 3 and 4 and between pixels 5 and 6 in the distance information, the difference in subject distances between pixels 8 and 9 does not exceed the distance threshold $T_{L2H}$ set for pixel 9. Accordingly, the segmentation control unit 109 sets segment regions so that pixels 3 and 4 and pixels 5 and 6 are segmented from one another. Due to this, segment regions 1401, 1402, and 1403 are set as illustrated in FIG. 14B.

By adopting such a configuration, sharp changes in subject distances that cannot be detected with the normal information can also be dealt with. Furthermore, it can be assumed that a range in which the normal information is changing continuously corresponds to a curved surface of a same single subject, such as a spherical surface, for example, and due to this, the composition of shape information can be performed without segmenting this into separate segment regions. Note that only the determination with respect to x-axis direction segmentation positions is described in the example in FIG. 14 because, as already mentioned above, a description is provided in the present embodiment assuming that, as a normal value in normal information, the angle $\theta_x$ that a projection vector acquired by projecting the corresponding unit surface normal vector onto the x-z plane forms with the x axis is used. Needless to say, however, the determination of y-axis direction segmentation positions can be similarly performed by using the angle $\theta_y$ that a projection vector acquired by projecting the same unit surface normal vector onto the y-z plane forms with the y axis.

(3) Technique Based on Luminance Variance Information

Next, a technique in which the segmentation control unit 109 sets segment regions based on variance information of luminance in a captured image will be described with reference to FIG. 15. FIG. 15A is a diagram (in which the horizontal axis indicates x-axis pixel positions and the vertical axis indicates variance values) indicating variance information (variance values) of luminance values corresponding to pixels in a captured image that have a specific y coordinate and that line up in the x-axis direction. In this technique, the segmentation control unit 109 determines whether or not to segment regions between pixels based on whether or not variance values have a difference greater than or equal to a threshold $T_D$ in the variance information.

For example, in a case in which subjects include a foreground and a background and there is a difference in luminance between the foreground and the background, edges of the foreground and background (pixels at which variance is high) can be specified by deriving the variance of luminance values. Here, the threshold $T_D$ may be a variance value that is set for an extraction in which a determination is made of whether or not an edge is present in a region in a luminance image having a target pixel at the center, for example. Furthermore, the threshold $T_D$ may be set by referring to a distribution (histogram) of the variance of luminance in a captured image (luminance image), for example, and in accordance with how large the size of a segment region becomes.

In the example in FIG. 15A, variance values exceeding the threshold $T_D$ are observed at pixels 4, 7, and 12. In this case, the segmentation control unit 109 sets segment regions so that these pixels and pixels present at pixel positions immediately following these pixels are segmented from one another. Due to this, segment regions 1501, 1502, and 1503 are set as illustrated in FIG. 15B.

Note that, while a description has been provided that segment regions are set in these segmentation techniques based on the two-dimensional information referred to, a minimum of the number of pixels may be set with respect to the sizes of the segment regions in order to increase the efficiency of processing of each segment region. For example, if the minimum size of segment regions is set as four pixels in the x-axis direction, the segmentation control unit 109 may perform control in the example in FIG. 15B such that the segment region 1502 is integrated with one of the adjacent segment regions, for example. Here, in order to suppress an increase in computation amount for a single segment region, for example, the smaller one of the adjacent segment regions, i.e., the segment region 1501 may be selected as the segment region with which the segment region 1502 is integrated.

Furthermore, similarly to embodiment 1, the concept of reliability degrees may be introduced with regard to the two-dimensional information referred to in the setting of segment regions, and the segmentation control unit 109 may perform control so that segmentation is not performed if a reliability degree falls below a predetermined value, even if the above-described segmentation conditions are satisfied. For example, in the form in which segment regions are set based on normal information, the reliability degree N, which is derived based on the ratio between the number Pm of captured images captured upon the derivation of a normal of a target pixel and the number P of captured images actually used for the derivation of normal information, may be used. Furthermore, also for the variance information of luminance, control of decreasing a reliability degree if the luminance of a target pixel is saturated, control of decreasing a reliability degree if the luminance image has a high signal-to-noise ratio, etc., for example, may be performed.

By adopting such configurations, when segment regions are dynamically set in accordance with the subject state indicated by the various types of information acquired, it is possible to prevent the segmentation, into a plurality of segment regions, of an image whose continuity would be difficult to guarantee in a case in which three-dimensional shapes composed for individual regions are combined (connected). Due to this, a three-dimensional shape of a subject that was present in an image capture range can be acquired in a suitable state when shape information composed for individual segment regions are combined, without having to perform processing of changing the scaling magnification and updating the shape information as in the embodiment 1.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-248365, filed Dec. 28, 2018, which is hereby incorporated by reference herein in its entirety.

What is claimed is:

1. A shape measurement device that composes shape information indicating a three-dimensional shape of a subject included in an image capture range based on normal information and distance information acquired for the subject, wherein the normal information and the distance information are two-dimensional information corresponding to a two-dimensional image in which the image capture range is captured and have a pixel structure corresponding to the two-dimensional image, and the shape measurement device comprises:

one or more processors; and a memory storing instructions which, when executed by the one or more processors, cause the shape measurement device to function as:

an acquisition unit configured to acquire the normal information and the distance information;

a setting unit configured to set processing-target segment regions with respect to the two-dimensional image upon composition of the shape information of the subject;

a first composition unit configured to, for each of the processing-target segment regions, compose first shape information based on the normal information;

a second composition unit configured to, for each of the processing-target segment regions, compose second shape information acquired by changing the first shape information based on the distance information; and a combination unit configured to compose combined shape information indicating the three-dimensional shape of the subject by combining the second shape information for a plurality of the processing-target segment regions.

2. The shape measurement device according to claim 1, wherein, for each of the processing-target segment regions, the first composition unit composes the first shape information by integrating the corresponding normal information.

3. The shape measurement device according to claim 1, wherein the distance information includes information of subject distances, and the second composition unit changes a depth-direction size of the three-dimensional shape expressed by the first shape information based on a distribution of the subject distances to the subject, the distribution of the subject distances included for each of the processing-target segment regions.

4. The shape measurement device according to claim 3, wherein the second composition unit determines a plurality of magnifications for changing the depth-direction size based on the distribution of the subject distances to the subject included for each of the processing-target segment regions.

5. The shape measurement device according to claim 4, wherein the setting unit sets the processing-target segment regions such that the two-dimensional image is uniformly segmented.

6. The shape measurement device according to claim 5, wherein, in a case in which, when the second shape information for an adjacent one of the processing-target segment regions is combined by the combination unit, continuity of the three-dimensional shape at a connection part of the combination cannot be guaranteed, the second composition unit composes the second shape information such that the first shape information is changed by using a magnification selected from the plurality of magnifications derived for individual ones of the processing-target segment regions so that a difference in the depth-direction size occurring between the adjacent segment regions is reduced.

7. The shape measurement device according to claim 6, wherein the second composition unit excludes, from the plurality of magnifications to be used for changing the first shape information, a magnification, among the plurality of magnifications derived for the respective ones of the processing-target segment regions so that the difference in the depth-direction size is reduced, for which a reliability degree of information of the processing-target segment region referred to upon the derivation does not fulfill a predetermined criterion.

8. The shape measurement device according to claim 7, wherein the reliability degree of the information of the processing-target segment region includes at least one of: a luminance, at the processing-target segment region, of the two-dimensional image in which the image capture range is captured; a focus state, at the processing-target segment region, of the two-dimensional image in which the image capture range is captured; and the number of two-dimensional images referred to for deriving the normal information for the processing-target segment region.

9. The shape measurement device according to claim 1, wherein the setting unit dynamically sets the processing-target segment regions based on at least one of the two-dimensional image, the normal information, and the distance information.

10. The shape measurement device according to claim 9, wherein the setting unit sets the processing-target segment regions such that, if a difference in subject distances between adjacent pixels in the distance information exceeds a distance threshold, segmentation of regions is performed based on the pixel position of the adjacent pixels.

11. The shape measurement device according to claim 10, wherein the setting unit, in accordance with size of a depth-direction component of the normal information indicated by the pixel in the two-dimensional image, changes the distance threshold for the pixel.

12. The shape measurement device according to claim 11, wherein the setting unit, for a pixel for which the size of the depth-direction component of the normal information indicated by the pixel in the two-dimensional image exceeds a normal threshold, sets a first distance threshold that is higher than a distance threshold set for a pixel for which the size of the depth-direction component of the normal information indicated by the pixel in the two-dimensional image falls below the normal threshold.

13. The shape measurement device according to claim 12, wherein the setting unit, even for a pixel for which the size of the depth-direction component of the normal information indicated by the pixel in the two-dimensional image exceeds the normal threshold, sets a second distance threshold lower than the first distance threshold given that sizes of depth-direction components of the normal information are continuously changing at peripheral pixels, including the pixel.

14. The shape measurement device according to claim 1, wherein the normal information is derived by analyzing a plurality of two-dimensional images in which the image capture range is captured while varying a position of a light source.

15. The shape measurement device according to claim 1, wherein an image capture device capturing the two-dimensional image of the image capture range includes an image sensor that captures a pair of pupil division images at a same time, and the distance information includes information of subject distances derived based on a defocus amount of a subject image in each pixel in the two-dimensional image, the defocus amount acquired from the pair of pupil division images.

16. A control method of a shape measurement device that composes shape information indicating a three-dimensional shape of a subject included in an image capture range based on normal information and distance information acquired for the subject, wherein the normal information and the distance information are two-dimensional information corresponding to a two-dimensional image in which the image capture range is captured and have a pixel structure corresponding to the two-dimensional image, and the control method comprises:

acquiring the normal information and the distance information;

setting processing-target segment regions with respect to the two-dimensional image upon composition of the shape information of the subject;

composing, for each of the processing-target segment regions, first shape information based on the normal information;

composing, for each of the processing-target segment regions, second shape information acquired by changing the first shape information based on the distance information; and composing combined shape information indicating the three-dimensional shape of the subject by combining the second shape information for a plurality of the processing-target segment regions.

17. A non-transitory computer-readable recording medium having recorded thereon a program for causing a computer that composes shape information indicating a three-dimensional shape of a subject included in an image capture range based on normal information and distance information, which are acquired for the subject, which are two-dimensional information corresponding to a two-dimensional image in which the image capture range is captured, and which have a pixel structure corresponding to the two-dimensional image, to execute:

acquiring the normal information and the distance information;

setting processing-target segment regions with respect to the two-dimensional image upon composition of the shape information of the subject;

composing, for each of the processing-target segment regions, first shape information based on the normal information;

composing, for each of the processing-target segment regions, second shape information acquired by changing the first shape information based on the distance information; and composing combined shape information indicating the three-dimensional shape of the subject by combining the second shape information for a plurality of the processing-target segment regions.

* * * * *